United States Patent
McDaniel et al.

(10) Patent No.: US 11,034,873 B2
(45) Date of Patent: *Jun. 15, 2021

(54) WEIGHTED COMPOSITION FOR TREATMENT OF A SUBTERRANEAN FORMATION

(71) Applicant: Halliburton Energy Services, Inc., Houston, TX (US)

(72) Inventors: Cato Russell McDaniel, The Woodlands, TX (US); Dale E. Jamison, Humble, TX (US); Xiangnan Ye, Cypress, TX (US); Timothy N. Harvey, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/753,506

(22) PCT Filed: Sep. 17, 2015

(86) PCT No.: PCT/US2015/050787
§ 371 (c)(1),
(2) Date: Feb. 19, 2018

(87) PCT Pub. No.: WO2017/048267
PCT Pub. Date: Mar. 23, 2017

(65) Prior Publication Data
US 2018/0298265 A1 Oct. 18, 2018

(51) Int. Cl.
*C09K 8/48* (2006.01)
*C09K 8/03* (2006.01)
*C04B 28/02* (2006.01)
*C04B 14/30* (2006.01)
C04B 20/00 (2006.01)
C04B 20/02 (2006.01)
C04B 20/10 (2006.01)

(52) U.S. Cl.
CPC ............ *C09K 8/032* (2013.01); *C04B 14/308* (2013.01); *C04B 28/02* (2013.01); *C09K 8/48* (2013.01); *C04B 20/008* (2013.01); *C04B 20/023* (2013.01); *C04B 20/107* (2013.01); *C04B 20/1074* (2013.01)

(58) Field of Classification Search
CPC ...... C09K 2208/10; C09K 8/36; C09K 8/032; C09K 8/68; C09K 8/74; C09K 8/80; C09K 8/502; C09K 8/52; C09K 2208/22; C09K 8/03; C09K 8/34; C09K 8/524; C09K 8/70; C09K 8/92; C09K 2208/20; C09K 2208/26; C09K 2208/32; C09K 8/035; C09K 8/426; C09K 8/512; C09K 8/516; C09K 8/54; C09K 8/62; C09K 8/665; C09K 8/685; C09K 8/805; C09K 8/86; C09K 2208/04; C09K 2208/18; C09K 2208/34; C09K 8/12; C09K 8/265; C09K 8/50; C09K 8/5083; C09K 8/5755; C09K 8/584; C09K 8/602; C09K 8/66; C09K 8/72; C09K 8/88; C09K 8/887; C09K 8/905; C09K 17/00; C09K 17/30; C09K 21/12; C09K 21/14; C09K 2208/24; C09K 2208/28; C09K 2208/30; C09K 3/22; C09K 8/00; C09K 8/05; C09K 8/06; C09K 8/28; C09K 8/32; C09K 8/40; C09K 8/44; C09K 8/467; C09K 8/48; C09K 8/493; C09K 8/504; C09K 8/5086; C09K 8/514; C09K 8/528; C09K 8/572; C09K 8/5751; C09K 8/5756; C09K 8/58; C09K 8/588; C09K 8/601; C09K 8/604; C09K 8/605; C09K 8/703; C09K 8/84; C09K 8/885; C09K 8/90; C09K 8/94; C04B 28/02; C04B 14/308; C04B 20/008; C04B 20/023; C04B 20/107; C04B 20/1074
See application file for complete search history.

(56) References Cited

U.S. PATENT DOCUMENTS

| | | | | |
|---|---|---|---|---|
| 2,442,120 A | * | 5/1948 | Duke | C09K 8/145 423/170 |
| 2,551,874 A | * | 5/1951 | Cerf | C09K 8/032 507/140 |
| 2,858,270 A | | 10/1958 | Harrison et al. | |
| 4,122,060 A | * | 10/1978 | Yallourakis | C09D 163/00 523/429 |

(Continued)

FOREIGN PATENT DOCUMENTS

EP 1913111 12/2012

OTHER PUBLICATIONS

The Usage of Precipitated barium sulfate—precipitated barium sulfate supplier, downloaded from https://www.sinokematerial.com/the-usage-of-precipitated-barium-sulfate-precipitated-bari . . . on Mar. 29, 2021.*

(Continued)

Primary Examiner — Kumar R Bhushan
(74) Attorney, Agent, or Firm — Tenley Krueger; C. Tumey Law Group PLLC

(57) ABSTRACT

Various embodiments disclosed relate to weighted compositions for treatment of a subterranean formation. In various embodiments, the present invention provides a method of treating a subterranean formation. The method can include placing in the subterranean formation a coated weighting agent. The coated weighting agent can include a weighting agent and an inorganic coating material on the weighting agent.

20 Claims, 12 Drawing Sheets

(56) References Cited

U.S. PATENT DOCUMENTS

| | | | |
|---|---|---|---|
| 4,337,160 A * | 6/1982 | Sample, Jr. | C09K 8/032 |
| | | | 507/140 |
| 5,376,629 A | 12/1994 | Smith | |
| 8,598,096 B2 | 12/2013 | Ballard et al. | |
| 2002/0117457 A1* | 8/2002 | Benton | C09K 8/06 |
| | | | 210/749 |
| 2004/0020651 A1* | 2/2004 | Burts, III | C09K 8/426 |
| | | | 166/295 |
| 2008/0302569 A1 | 12/2008 | deBoer | |
| 2008/0302570 A1* | 12/2008 | deBoer | E21B 21/001 |
| | | | 175/25 |
| 2014/0073538 A1* | 3/2014 | Saini | C09K 8/512 |
| | | | 507/215 |
| 2014/0142221 A1 | 5/2014 | Bowles et al. | |
| 2017/0369329 A1* | 12/2017 | Paynter | C01F 11/181 |
| 2018/0010031 A1* | 1/2018 | Galindo | E21B 21/003 |

OTHER PUBLICATIONS

International Search Report and Written Opinion for PCT/US2015/050787 dated May 13, 2016.

Canadian Examiner's Letter for Application No. 2,992,556, dated Aug. 19, 2019.

* cited by examiner

US 11,034,873 B2

WEIGHTED COMPOSITION FOR TREATMENT OF A SUBTERRANEAN FORMATION

BACKGROUND

Weighting materials can be used in a variety of subterranean operations. For example, weighting materials can be used in drilling fluids during subterranean operations to increase the density of the drilling fluid. Despite their wide use, weighting materials can be abrasive and can thus negatively impact the subterranean operations in which they are employed. Further, the settling and sagging of weighting materials may lead to safety and operational problems, particularly in inclined boreholes.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
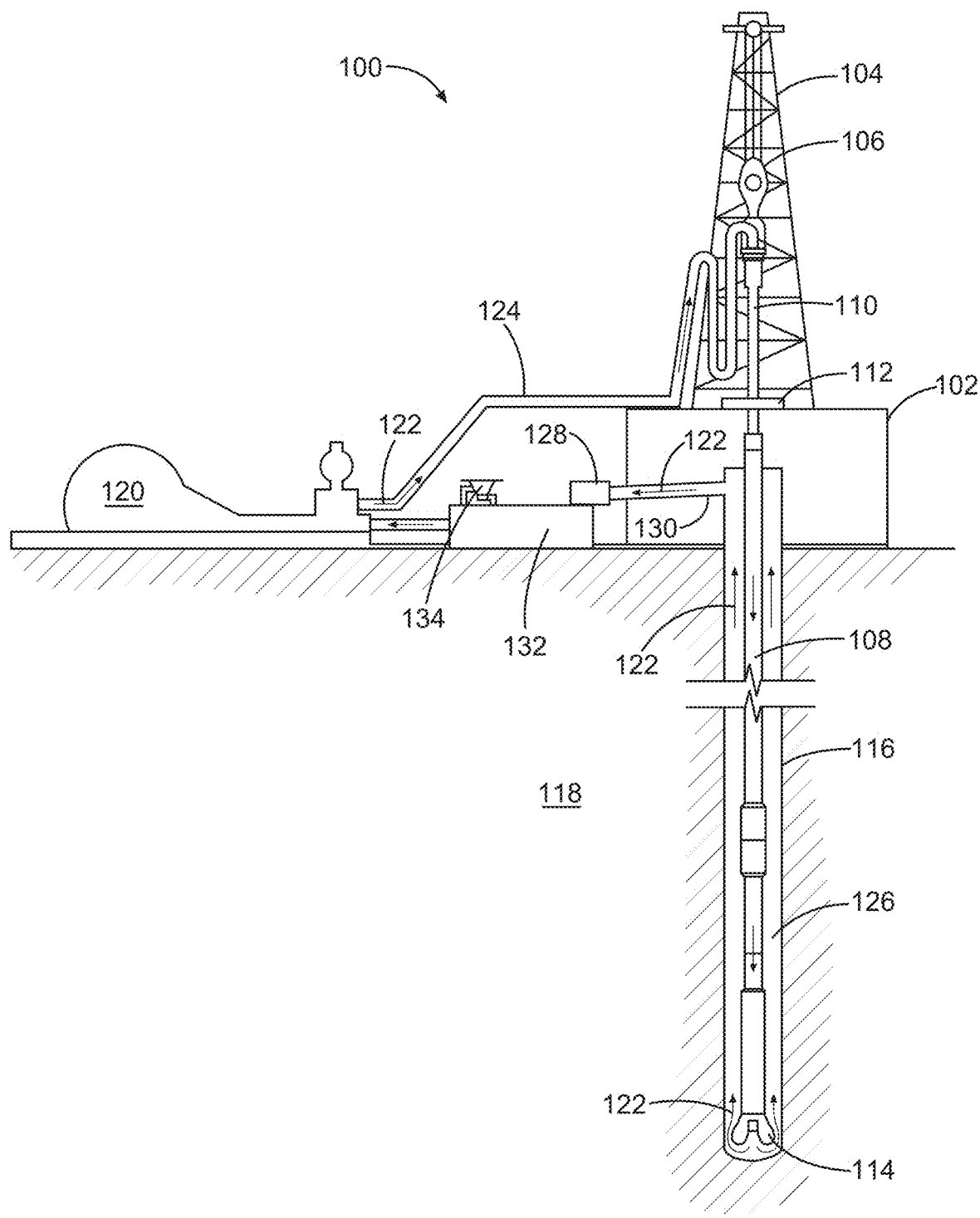
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, $OC(O)N(R)_2$, CN, $CF_3$, $OCF_3$, R, C(O), methylenedioxy, ethylenedioxy, $N(R)_2$, SR, SOR, $SO_2R$, $SO_2N(R)_2$, $SO_3R$, C(O)R, C(O)C(O)R, $C(O)CH_2C(O)R$, C(S)R, C(O)OR, OC(O)R, $C(O)N(R)_2$, $OC(O)N(R)_2$, $C(S)N(R)_2$, $(CH_2)_{0-2}N(R)C(O)R$, $(CH_2)_{0-2}N(R)N(R)_2$, $N(R)N(R)C(O)R$, N(R)N(R)C(O)OR, $N(R)N(R)CON(R)_2$, $N(R)SO_2R$, $N(R)SO_2N(R)_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the teiin "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are positive integers and mean having any of a to b number of carbon atoms. For example, (C$_1$-C$_4$)hydrocarbyl means the hydrocarbyl group can be methyl (C$_1$), ethyl (C$_2$), propyl (C$_3$), or butyl (C$_4$), and (C$_0$-C$_b$)hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "room temperature" as used herein refers to a temperature of about 15° C. to 28° C.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl folinamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^+$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

In various embodiments, the present invention provides a method of treating a subterranean formation. The method includes placing in the subterranean formation a weighted composition that includes a coated weighting agent. The coated weighting agent includes a weighting agent and an inorganic coating material on the weighting agent.

In various embodiments, the present invention provides a method of treating a subterranean formation. The method includes placing in the subterranean formation a weighted composition including a coated weighting agent. The coated weighting agent includes acid-treated iron oxide. The coated weighting agent also includes a crystalline inorganic coating material on the iron oxide. The crystalline inorganic coating material is selected from the group consisting of barium sulfate, calcium carbonate, and combinations thereof.

In various embodiments, the present invention provides a system. The system includes a tubular disposed in a subterranean formation. The system also includes a pump configured to pump a weighted composition in the subterranean formation through the tubular. The weighted composition includes a coated weighting agent. The coated weighting agent includes a weighting agent and an inorganic coating material on the weighting agent.

In various embodiments, the present invention provides a coated weighting agent for treatment of a subterranean formation. The coated weighting agent includes a weighting agent and an inorganic coating material on the weighting agent. In various embodiments, the present invention provides a weighted composition for treatment of a subterranean formation including the coated weighting agent.

In various embodiments, the present invention provides a coated weighting agent for treatment of a subterranean formation. The coated weighting agent includes an acid-treated iron oxide. The coated weighting agent also includes a crystalline inorganic coating material on the weighting agent. The crystalline inorganic coating material is selected from the group consisting of barium sulfate, calcium carbonate, and combinations thereof. In various embodiments, the present invention provides a weighted composition for treatment of a subterranean formation including the coated weighting agent.

In various embodiments, the present invention provides a method of preparing a weighted composition for treatment of a subterranean formation. The method includes forming a weighted composition that includes a coated weighting agent. The coated weighting agent includes a weighting agent and an inorganic coating material on the weighting agent.

In various embodiments, the coated weighting agent, the composition including the same, and the method of using either one of the same, can have various advantages over other weighting agents, compositions, and methods, at least some of which are unexpected. For example, in various embodiments, the weighting agent can have greater surface roughness than other weighting agents, such as a greater surface roughness than the uncoated core material, such as a greater surface roughness than uncoated hematite. In various embodiments, the greater surface roughness can provide a lower settling rate than the corresponding uncoated core material. In various embodiments, the weighted composition including the coated weighting agent can have zero static sag or reduced static sag compared to other weighted compositions, such as compared to other weighted compositions including the corresponding uncoated core material, such as compared to uncoated hematite-weighted compositions. In various embodiments, the settling rate of the weighted composition can be more precisely controlled using the coated weighting agent when compared to a corresponding weighted composition without the coated weighting agent.

In various embodiments, the weighted composition, including the coated weighting agent, can be formulated to lower the abrasion character of the weighting agent. In various embodiments, the coated weighting agent can be softer (e.g., less abrasive) than other weighting agents, such as compared to the corresponding uncoated core material. To that end, employing the weighted composition, including the coated weighting agent, in drilling fluids can reduce damage to equipment and increase the longevity of such equipment. As such, the weighted composition, including the weighted coating agent, can decrease the cost of drilling operations, as the need to replace or repair equipment may be decreased.

In various embodiments, the coated weighting agent can have a different specific gravity than the corresponding uncoated core material. In various embodiments, the specific gravity of the inorganic coating material can effectively be increased by depositing it onto the surface of a weighting agent that has a higher specific gravity, or can be decreased by depositing it onto the surface of a weighting agent that has a lower specific gravity. Likewise, in various embodiments, the specific gravity of a weighting agent can be decreased by depositing onto it an inorganic coating material that has a lower specific gravity, or can be increased by depositing onto it an inorganic coating material that has a higher specific gravity.

In various embodiments, the coated weighting agent can be less expensive as compared to other materials. In various embodiments, the coated weighting agent can be less expensive per unit volume than other weighting materials, such as compared to weighting materials made from a single compound (e.g., barium sulfate, or calcium carbonate). In various embodiments, the coated weighting agent can be less expensive per unit mass than other weighting materials, such as compared to weighting materials made from a single compound (e.g., barium sulfate, or calcium carbonate). In various embodiments, the coated weighting agent and the composition including the same can be more health, safety, and environmentally-friendly than other weighting agents and compositions including the same.

In various embodiments, the coated weighting agent can modify the viscosity of the surrounding composition. In various embodiments, the viscosity of the weighted composition can be more precisely modified by employing a coated weighting agent when compared to a corresponding weighted composition without the coated weighting agent, or including the corresponding uncoated core material.

In various embodiments, the coated weighting agent can be more acid-soluble than other weighting agents. For example, in various embodiments, the crystalline inorganic coating material and weighting agent can be selected so that the resulting coated weighting agent is at least partially acid soluble. In various embodiments, the coated weighting agent can have a more precisely tailored (e.g., predetermined) acid solubility than other weighting agents, such as due to the selection of the weighting agent and coating material, and such as due to the degree of coating of the coating material on the weighting agent.

In various embodiments, the weighted composition can have a positive impact on filtration and filter cakes. In various embodiments, the weighted composition can be altered to positively affect the separation efficiency when using conventional equipment. In various embodiments, the coated weighting agent can be more suitable for use in a drill-in fluid than other weighting agents, such as due to higher acid-solubility or more configurable acid-solubility, less contamination to the reservoir, and less damage to the reservoir and surrounding flow-pathways.

Method of Treating a Subterranean Formation

In various embodiments, the present invention provides a method of treating a subterranean formation. The method includes placing in the subterranean formation a weighted composition including a coated weighting agent including a weighting agent and an inorganic coating material on (e.g., contacting, or coating) the weighting agent.

The placing of the weighted composition in the subterranean formation can include contacting the composition and any suitable part of the subterranean formation, or contacting the weighted composition and a subterranean material, such as any suitable subterranean material. In some examples, the placing of the weighted composition in the subterranean formation includes contacting the weighted composition with or placing the weighted composition in at least one of a fracture, at least a part of an area surrounding a fracture, a flow pathway, an area surrounding a flow pathway, and an area desired to be fractured. The placing of the weighted composition in the subterranean formation can be any suitable placing and can include any suitable contacting between the subterranean formation and the weighted composition. The placing of the weighted composition in the subterranean formation can include at least partially depositing the weighted composition in a fracture, flow pathway, or area surrounding the same. The obtaining or providing of the weighted composition can occur at any suitable time and at any suitable location. The obtaining or providing of the weighted composition can occur above the surface. The obtaining or providing of the weighted composition can occur in the subterranean formation (e.g., downhole).

In some embodiments, the method can be a method of drilling, stimulation, fracturing, spotting, clean-up, completion, remedial treatment, applying a pill, acidizing, cementing, packing, spotting, or a combination thereof.

In some embodiments, the weighted composition is a drilling fluid or further includes a drilling fluid. A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can be a drill-in drilling fluid for drilling into a production zone (e.g., petroleum-producing zone) or reservoir (e.g., petroleum producing reservoir). The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the weighted composition or a mixture including the same in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), an aqueous base (e.g., sodium hydroxide or potassium hydroxide), an alcohol or polyol, cellulose, a starch, an alkalinity control agent, a density control agent such as a density modifier (e.g., barium sulfate), a surfactant (e.g., betaines, alkali metal alkylene acetates, sultaines, ether carboxylates), as emulsifier, a dispersant, a polymeric stabilizer, a crosslinking agents, a polyacrylamide, a polymers or a combination of polymers, an antioxidant, a heat stabilizers, a foam control agent, a solvent, a diluent, a plasticizer, a filler or inorganic particle (e.g., silica), a pigment, a dye, a precipitating agent (e.g., silicates or aluminum complexes), and a rheology modifier such as a thickener or viscosifier (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

In various embodiments, the method can include drilling into the subterranean formation, using the weighted composition as a drilling fluid. In some embodiments, the method includes drilling into a production zone or reservoir in the subterranean formation using the weighted composition as a drill-in fluid. The method can include cleaning the coated weighting agent from the production zone or reservoir after drilling into the production zone or reservoir. The cleaning can include at least partially dissolving the coated weighting agent with an acidic solution. In some embodiments, the clean-up process can be controlled by controlling the amount of inorganic coating material on the coated weighting agent, such as when the inorganic coating material (e.g., $CaCO_3$) has a different rate of dissolution than the weighting agent (e.g., iron oxide, wherein both $CaCO_3$ and iron oxide are completely soluble in acid).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

The method can include hydraulic fracturing, such as a method of hydraulic fracturing to generate a fracture or flow pathway. The placing of the weighted composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). In some embodiments, the method includes placing the weighted composition in a subterranean formation and fracturing at least part of the subterranean formation to form at least one subterranean fracture. The method can include perfomaing a stimulation treatment at least one of before, during, and after placing the weighted composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the weighted composition is placed or contacted, or the weighted composition is placed or contacted to an area surrounding the generated fracture or flow pathway.

In some embodiments, the method further includes obtaining or providing the weighted composition, wherein the obtaining or providing of the weighted composition occurs above-surface (e.g., the components of the composition are mixed above-surface). In some embodiments, the method further includes obtaining or providing the weighted composition, wherein the obtaining or providing of the weighted composition occurs in the subterranean formation (e.g., the components of the composition are mixed in the subterranean formation).

In some embodiments, the viscosity of the weighted composition is different compared to a corresponding composition without the coated weighting agent. The viscosity of the weighted composition can be greater than the viscosity of the corresponding composition without the coated weighting agent. In some embodiments, the viscosity of the weighted composition is less than the viscosity of the corresponding composition without the coated weighting agent. The viscosity of the weighted composition that is or that includes a drilling fluid can be greater than or less than the viscosity of the corresponding composition without the coated weighting agent.

In various embodiments, the viscosity of the weighted composition can be modified by modifying the morphology of the coated weighting agent. In some embodiments, the viscosity of the weighted composition can be increased by modifying the morphology of the weighted composition. The viscosity of the weighted composition can be increased by increasing the morphological complexity of the surface of the coated weighting agent. The morphological complexity of the surface of the coated weighting agent can be increased by increasing the number, size, and/or complexity of the crystalline or amorphous inorganic coating material on the weighting agent. In some embodiments, the viscosity of the weighted composition can be decreased by modifying the morphology of the weighted composition. The morphological complexity of the surface of the coated weighting agent can be decreased by decreasing the number, size, and/or complexity of the crystalline inorganic coating material crystals on the weighting agent. The morphological complexity of the surface of the coated weighting agent can be decreased by decreasing the number, size, and/or complexity of the crystalline or amorphous inorganic coating material on the weighting agent.

In some embodiments, the method further includes combining the weighted composition with an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the weighted composition in the subterranean formation includes placing the mixture in the subterranean formation. The cementing fluid can include Portland cement, pozzolana cement, gypsum cement, high alumina content cement, slag cement, silica cement, or a combination thereof.

In some embodiments, prior to, during, or after placing the weighted composition in the subterranean formation, the weighted composition is used in the subterranean formation, either alone or in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

In some embodiments, the method includes pumping the weighted composition through a tubular disposed in a wellbore and into the subterranean formation to place the weighted composition in a subterranean formation. In some embodiments, the method includes placing the weighted composition in the subterranean formation by pumping the weighted composition through a drill string disposed in a wellbore, through a drill bit at a downhole end of the drill string, and back above-surface through an annulus. Further, the method can include processing the weighted composition exiting the annulus with at least one fluid processing unit to generate a cleaned weighted composition and recirculating the cleaned weighted composition through the wellbore.

Coated Weighting Agent

The weighted composition includes a weighting agent and an inorganic coating material contacting the weighting agent. As used herein, a "weighting agent" refers to a material that may be used to increase density of a subterranean treatment fluid, such as a drilling fluid. As used herein, the term "inorganic coating material" refers to any suitable material that can be deposited on the weighting agent. When deposited on the weighting agent, the inorganic coating material may be of crystalline form or amorphous form. As used herein, the term "crystalline inorganic coating material" refers to a material that, at least when deposited on the weighting agent, has a crystalline form with one or more substantially uniform or repetitious spatial parameters (e.g., lattice plane spacing, unit cell dimensions, unit cell configurations, etc.). As used herein, the term "amorphous inorganic coating material" refers to a material that, at least when deposited on the weighting agent, does not possess a distinguishable crystal structure (e.g., an amorphous form).

In various embodiments, the coated weighting agent can be less abrasive than the weighting agent (e.g., the uncoated weighting agent). The coated weighting agent can have reduced abrasive qualities, with increased lubricity, as compared to the uncoated weighting agent, due to the inorganic coating material on the weighting agent. The coated weighting agent can be softer than the uncoated weighting agent.

In some embodiments, the coated weighting agent can have greater surface roughness as compared to the weighting agent (e.g., the uncoated weighting agent). The greater surface roughness can provide greater drag on particles of the coated weighting agent from the surrounding composition, as compared to the drag on uncoated particles of the weighting agent. The greater drag provided can decrease the rate of settling of particles of the coated weighting agent from a suspension of the particles as compared to the rate of settling of uncoated weighting agent from a corresponding suspension, or can eliminate such settling of particles (e.g., under static conditions). In some embodiments, the increased surface roughness of the coated weighting agent can be quantified as an increased surface area as compared to an uncoated weighting agent. For example, the coated weighting agent can have a surface area that is about 101% to about 100,000% of the surface area of the weighting agent (e.g., the uncoated weighting agent), or about 110% to about 10,000%, or about 101% or less, or about 105%, 110, 120, 130, 140, 150, 160, 180, 200, 225, 250, 275, 300, 350, 400, 450, 500, 600, 700, 800, 900, 1,000, 1,250, 1,500, 1,750, 2,000, 2,500, 5,000, 10,000, 15,000, 20,000, 25,000, 50,000, 75,000, or about 100,000% or more greater.

In some embodiments, the coated weighting agent can be formed by growing the crystalline inorganic coating material on the weighting agent. Growing the crystalline inorganic coating material on the weighting agent can include allowing the weighting agent to facilitate the deposition or crystallization of the crystalline inorganic coating material onto the weighting agent. In some embodiments, the coated weighting agent is made by a process of growing crystals of the crystalline inorganic coating material on the weighting agent.

In some embodiments the coated weighting agent has a different specific gravity than the inorganic coating material used to form the coated weighting agent. The coated weighting agent can have a higher specific gravity that the inorganic coating material used to form the coated weighting agent. Alternatively, the coated weighting can have a lower specific gravity that the inorganic coating material used to form the coated weighting agent. The specific gravity can be referenced to water.

In some embodiments, the coated weighting agent has a different specific gravity than the weighting agent used to form the coated weighting agent. The coated weighting agent can have a higher specific gravity than the weighting agent used to form the coated weighting agent. Alternatively, the coated weighting agent can have a lower specific gravity than the weighting agent used to form the coated weighting agent.

In some embodiments, the coated weighting agent has a specific gravity of at least about 2.6. In some embodiments, the coated weighting agent has a specific gravity of about 2.6-20, 2.7-5.1, 3.0-19, 4-18, 5-17, 5.5-16, 6-15, 6.5-14, 7-13, 8-12, or about 9-11 or about 2.6 or less, or about 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.5, 6, 7, 8, 9, 10, 11, 12, 13, 14, 15, 16, 17, 18, 19, or about 20 or more.

In various embodiments, the coated weighting agent can include a weighting agent that is at least partially acid soluble. In some embodiments the weighting agent can be acid soluble. The term "acid soluble" refers to a material that is substantially soluble at a pH of less than about 6.5 and substantially insoluble at a pH of greater than about 7.0. In some embodiments, the weighting agent can be acid soluble, such as substantially soluble at a pH of about 6.5, 6, 5.5, 5, 4.5, 4, 3.5, 3.0, 2.5, or 2.0. In some embodiments, the acid soluble weighting agent can be substantially insoluble at a pH of about 7, 7.5, 8, 8.5, 9, 9.5, 10.0, 10.5, or 11. In some embodiments, about 1-25 wt %, 25-50 wt %, 50-75 wt %, 75-100 wt %, 1-10 wt %, 10-20 wt %, 20-30 wt %, 30-40 wt %, 40-50 wt %, 50-60 wt %, 60-70 wt %, 70-80 wt %, 80-90 wt %, 90-100 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt % or about 100 wt % of the weighting agent is soluble at a pH of less than about 6.5, such as at room temperature over a time period of about 0.1 s to about 7 d, or about 1 min to about 24 h, or about 0.1 s or less, or about 1 s, 2, 3, 4, 5, 10, 20, 30, 40, 50 s, 1 min, 2, 3, 4, 5, 10, 15, 20, 30, 40, 50, min, 1 h, 2, 3, 4, 5, 10, 15, 20 h, 1 d, 2, 3, 4, 5, 6 d, or about 7 d or more.

In various embodiments, the coated weighting agent can include an inorganic coating material that is at least partially acid soluble. In some embodiments, the inorganic coating material can be acid soluble. In some embodiments, about 1-25 wt %, 25-50 wt %, 50-75 wt %, 75-100 wt %, 1-10 wt %, 10-20 wt %, 20-30 wt %, 30-40 wt %, 40-50 wt %, 50-60 wt %, 60-70 wt %, 70-80 wt %, 80-90 wt %, 90-100 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt % or about 100 wt % of the inorganic coating material is soluble at a pH of less than about 6.5, such as at room temperature over a time period of about 0.1 s to about 7 d, or about 1 min to about 24 h, or about 0.1 s or less, or about 1 s, 2, 3, 4, 5, 10, 20, 30, 40, 50 s, 1 min, 2, 3, 4, 5, 10, 15, 20, 30, 40, 50, min, 1 h, 2, 3, 4, 5, 10, 15, 20 h, 1 d, 2, 3, 4, 5, 6 d, or about 7 d or more.

In various embodiments, the coated weighting agent can be at least partially acid soluble (e.g., hematite coated with calcium carbonate). In some embodiments, the coated weighting agent can be acid soluble. In some embodiments, about 1-25 wt %, 25-50 wt %, 50-75 wt %, 75-100 wt %, 1-10 wt %, 10-20 wt %, 20-30 wt %, 30-40 wt %, 40-50 wt %, 50-60 wt %, 60-70 wt %, 70-80 wt %, 80-90 wt %, 90-100 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt % or about 100 wt % of the coated weighting agent is soluble at a pH of less than about 6.5, such as at room temperature over a time period of about 0.1 s to about 7 d, or about 1 min to about 24 h, or about 0.1 s or less, or about 1 s, 2, 3, 4, 5, 10, 20, 30, 40, 50 s, 1 min, 2, 3, 4, 5, 10, 15, 20, 30, 40, 50, min, 1 h, 2, 3, 4, 5, 10, 15, 20 h, 1 d, 2, 3, 4, 5, 6 d, or about 7 d or more.

In various embodiments, the coated weighting agent has a particle size of about 1-1,000 μm. The term "particle size" as used herein refers to diameter of the particle, or the largest dimension of the particle. The term "particle size" can refer to the D50 particle size (e.g., the size at which 50% of the particles are smaller) of the coated weighting agent in the weighted composition. For example, a rod-like particle would have a particle size based on the length of the rod-like particle. In some embodiments, the coated weighting agent has a particle size of about 0.1-10 μm, 0.1-20 μm, 0.1-30 μm, 0.1-40 μm, 0.1-50 μm, 0.1-60 μm, 0.1-70 μm, 0.1-80 μm, 0.1-90 μm, 0.1-100 μm, 0.1-200 μm, 0.1-300 μm, 0.1-400 μm, 0.1-500 μm, 0.1-600 μm, 0.1-700 μm, 0.1-800 μm, 0.1-900 μm, 0.1-1,000 μm, 10-1,000 μm, 20-1,000 μm, 30-1,000 μm, 40-1,000 μm, 50-1,000 μm, 60-1,000 μm, 70-1,000 μm, 80-1,000 μm, 90-1,000 μm, 100-1,000 μm, 200-1,000 μm, 300-1,000 μm, 400-1,000 μm, 500-1,000 μm, 600-1,000 μm, 700-1,000 μm, 800-1,000 μm, 900-1,000 μm, 100-900 μm, 200-800 μm, 300-700 μm, or about 400-600 μm or about 1 μm, 5 μm, 10 μm, 15 μm, 20 μm, 25 μm, 30 μm, 35 μm, 40 μm, 45 μm, 50 μm, 60 μm, 65 μm, 70 μm, 80 μm, 90 μm, 100 μm, 150 μm, 200 μm, 300 μm, 400 μm, 500 μm, 600 μm, 700 μm, 800 μm, 900 μm, 1000 μm. In some embodiments, the coated weighting agent has a particle size of at least about 1 μm, 5 μm, 10 μm, 15 μm, 20 μm, 30 μm, 40 μm, 50 μm, 60 μm, 70 μm, 80 μm, 90 μm, or at least about 100 μm.

In some embodiments, the coated weighting agent is less abrasive than the corresponding weighting agent that is free of the inorganic coating material. The term "abrasive" as used herein refers to ability of one material to wear away at another material.

In various embodiments, the inorganic coating material is about 1 wt % to about 50 wt % of the coated weighting agent. The inorganic coating material can be about 1-5 wt %, 1-10 wt %, 1-15 wt %, 1-20 wt %, 1-25 wt %, 1-30 wt %, 1-35 wt %, 1-40 wt %, 1-45 wt %, 1-50 wt %, 5-15 wt %, 5-20 wt %, 5-25 wt %, 5-30 wt %, 5-35 wt %, 5-40 wt %, 5-45 wt %, 5-50 wt %, 10-30 wt %, 10-50 wt %, 1-5 wt %, 5-10 wt %, 10-15 wt %, 15-20 wt %, 20-25 wt %, 25-30 wt %, 30-35 wt %, 35-40 wt %, 40-45 wt %, 45-50 wt %, 50-99 wt %, 55-99 wt %, 60-99 wt %, 65-99 wt %, 70-99 wt %, 75-99 wt %, 80-99 wt %, 85-99 wt %, 90-99 wt %, 95 wt %, or about 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or about 99 wt % of the coated weighting agent.

In some embodiments, the inorganic coating material covers about 10% to about 50% of the surface of the weighting agent. The inorganic coating material can cover about 1-50%, 50-100%, 1%-20%, 20%-60%, 60%-100%, 20%-40%, 40%-60%, 60%-80%, or about 80%-100%, or about 5%, 10%, 15%, 20%, 25%, 30%, 35%, 40%, 45%, 50%, 55%, 60%, 65%, 70%, 75%, 80%, 85%, 90%, 95%, or about 100% of the surface of the weighting agent. The term "cover" and "covers," with respect to the crystalline material covering the weighting agent, can refer to portions of the weighting agent that are substantially inaccessible to solvent in the surrounding solution due to the coating, or can refer to the ability of the inorganic coating material to substantially prevent the covered surface of the weighting agent from causing abrasion to other materials. In some embodiments, the covered surface can be calculated by scanning electron microscopy or other suitable methods.

Weighting Agent.

The weighted composition includes a weighting agent. In various embodiments, the weighting agent can be chosen from hard minerals, metal oxides, metal particles, metal alloys, and combinations thereof. The weighting agent can be chosen from $Al_2O_3$, $Al_2SiO_5$, $BiO_3$, $Bi_2O_3$, $CaSO_4$, $CaPO_4$, $CdS$, $Ce_2O_3$, $(Fe,Mg)Cr_2O_4$, $Cr_2O_3$, $CuO$, $Cu_2O$, $Cu_2(AsO_4)(OH)$, $CuSiO_3 \cdot H_2O$, $Fe_3Al_2(SiO_4)_3$, $Fe^{2+}Al_2O_4$, $Fe_2SiO_4$, $FeCO_3$, $Fe_2O_3$, $\alpha\text{-}Fe_2O_3$, $\alpha\text{-}FeO(OH)$, $Fe_3O_4$, $FeTiO_3$, $(Fe,Mg)SiO_4$, $(Mn,Fe,Mg)(Al,Fe)_2O_4$, $CaFe^{2+}_2Fe^{3+}Si_2O_7O(OH)$, $(YFe^{3+}Fe^{2+}U,Th, Ca)_2(Nb,Ta)_2O_8$, $MgO$, $Mn_2SiO_4$, $Mn(II)_3Al_2(SiO_4)_3$, $(Na_{0.3}Ca_{0.1}K_{0.1})(Mn^{4+}, Mn^{3+})_2O_4 \cdot 1.5\ H_2O$, $(Mn,Fe)_2O_3$, $(Mn^{2+},Fe^{2+},Mg)(Fe^{3+}, Mn^{3+})_2O_4$, $(Mn^{2+},Mn^{3+})_6[(O_8)(SiO_4)]$, $Ca(Mn^{3+},Fe^{3+})_{14}SiO_{24}$, $Ba(Mn^{2+})(Mn^{4+})_8O_{16}(OH)_4$, $CaMoO_4$, $MoO_2$, $MoO_3$, $NbO_4$, $(Na,Ca)_2Nb_2O_6(OH,F)$, $(Y,Ca,Ce,U,Th)(Nb, Ta,Ti)_2O_6$, $(Y,Ca,Ce,U,Th)(Ti,Nb,Ta)_2O_6$, $(Fe,Mn)(Ta,Nb)_2O_6$, $(Ce,La,Ca)BSiO_5$, $(Ce,La)CO_3F$, $(Y,Ce)CO_3F$, $MnO$, $MnO_2$, $Mn_2O_3$, $Mn_3O_4$, $Mn_2O_7$, $MnO(OH)$, $(Mn^{2+},Mn^{3+})_2O_4$, $NiO$, $NiAs_2$, $NiAs$, $NiAsS$, $Ni_2Fe$ to $Ni_3Fe$, $(Ni,Co)_3S_4$, $PbSiO_3$, $PbCO_3$, $(PbCl)_2CO_3$, $Pb^{2+}2Pb^{4+}O4$, $PbCu[(OH)_2(SO_4)]$, $(Sb^{3+},Sb^{5+})O_4$, $Sb_2SnO_5$, $Sc_2O_3$, $SnO$, $SnO_2$, $Cu_2FeSnS_4$, $SrO$, $SrSO_4$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $ZnCO_3$, $ZnO$, $ZnFe_2O_4$, $ZnAl_2O_4$, $ZnCO_3$, $ZnO$, $ZrSiO_4$, $ZrO_2$, $ZrSiO_4$, allemontite, altaite, aluminum oxide, anglesite, tin oxide, antimony trioxide, awaruite, barium sulfate, bastnaesite, beryllium oxide, birnessite, bismite, bismuth oxycarbonates, bismuth oxychloride, bismuth trioxide, bismuth (III) oxide, bixbyite, bournonite, braunite, brucite, cadimum sulfide, calayerite, calcium oxide, calcium carbonate, cassiterite, cerium oxide, cerussite, chromium oxide, clinoclase, columbite, copper, copper oxide, corundum, crocoite, cuprite, dolomite, euxenite, fergusonite, franklinite, gahnite, geothite, greenockite, hausmmanite, hematite, hercynite, hessite, ilvaite, Jacobsite, magnesium oxide, manganite, manganosite, magnetite, manganese dioxide, manganese (IV) oxide, manganese oxide, manganese tetraoxide, manganese (II) oxide, manganese (III) oxide, microlite, minium, molybdenum (IV) oxide, molybdenum oxide, molybdenum trioxide, nickel oxide, pearceite, phosgenite, psilomelane, pyrochlore, pyrolusite, rutile, scandium oxide, siderite, smithsonite, spessartite, stillwellite, stolzite, strontium oxide, tantalite, tenorite, tephroite, thorianite, thorite, tin dioxide, tin (II) oxide, titanium dioxide, vanadium oxide, vanadium trioxide, vanadium (IV) oxide, vanadium (V) oxide, witherite, wulfenite, yttrium oxide, zincite, zircon, zirconium oxide, zirconium silicate, zinc oxide, and combinations thereof. In some embodiments, the weighting agent can be chosen from iron, nickel and combinations thereof.

In some embodiments, the weighting agent has a specific gravity of about 0.5-20, 2.6-20, 2.7-5.1, 3.0-19, 4-18, 5-17, 5.5-16, 6-15, 6.5-14, 7-13, 8-12, or about 9-11 or about 0.5 or less, or about 0.6, 0.8, 1, 1.2, 1.4, 1.6, 1.8, 2, 2.2, 2.4, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.5, 6, 7, 8, 9, 10, 11, 12, 13, 14, 15, 16, 17, 18, 19, or about 20 or more.

In various embodiments, the weighting agent can be an acid-treated weighting agent. The acid-treated weighting agent can have a greater surface area than a corresponding weighting agent not treated with acid. The acid-treated weighting agent can have a greater surface roughness than a surface roughness of a corresponding weighting agent not treated with acid. The acid-treated weighting agent can have a greater concentration of inorganic coating material-seeding sites (e.g., sites for seeding the growth of crystals of the inorganic coating material) than the concentration of such seeding sites on a corresponding weighting agent not treated with acid. In some embodiments, the greater surface roughness and increased seeding site concentration can be quantified by an increase in surface area. For example, the acid-treated weighting agent can have a surface area that is about 101% to about 100,000% of the surface area of the untreated weighting agent (e.g., the weighting agent free of acid treatment), or about 110% to about 10,000%, or about 101% or less, or about 105%, 110, 120, 130, 140, 150, 160, 180, 200, 225, 250, 275, 300, 350, 400, 450, 500, 600, 700, 800, 900, 1,000, 1,250, 1,500, 1,750, 2,000, 2,500, 5,000, 10,000, 15,000, 20,000, 25,000, 50,000, 75,000, or about 100,000% or more greater.

Inorganic Coating Material.

The coated weighting agent includes an inorganic coating material on the weighting agent. In various embodiments, the inorganic coating material can be a crystalline inorganic coating material. In various embodiments, the inorganic coating material can be an amorphous inorganic coating material.

In various embodiments, the crystalline inorganic coating material can include a first ion and a corresponding second counterion. In various embodiments, the crystalline inorganic coating material can be chosen from calcium salts, barium salts, bismuth salts, aluminum salts, sodium salts, potassium salts, iron salts, nickel salts, cadmium salts, cesium salts, strontium salts, magnesium salts, zinc salts, lead salts, and mixtures thereof. In some embodiments, the crystalline inorganic coating material is chosen from $As_2S_3$, $BaCO_3$, $(BiO)_2CO_3$, $(Ca,Mg)CO_3$, $FeCO_3$, $PbCO_3$, $(PbCl)_2CO_3$, $PbCu(OH)_2(SO_4)$, $Sb_2S_3$, $SnS$, $SnS_2$, $Sn_2S_3$, $SrSO_4$, $SrCO_3$, $ZnCO_3$, ankerite (e.g., $CaFe(CO_3)_2$), aluminum phosphate, aluminum sulfate, barium phosphate, iron phosphate, barium sulfide, barium sulfate, beryllium sulfide, bismuth sulfide, calcium oxalate, calcium sulfide, calcium phosphate, calcium sulfate, calcium citrate, calcium carbonate, calcite (e.g., when crystals are grown on the particle at about room temperature to less than 70° C.), aragonite (e.g., when crystals are grown on the particle at over about 70° C.), manganese carbonate, gaspite (e.g., $(Ni,Mg,Fe^{2+})CO_3$), huntite (e.g., $Mg_3Ca(CO_3)_4$), magnesite, nickel carbonate, strontium sulfide, thallium sulfide, and mixtures thereof.

In various embodiments, the amorphous inorganic coating material can be chosen from phosphates, carbonates, silicates, tungstates, molybdates, aluminates, titanates, sulfates, sulfides, oxides, hydroxides, silicates, silica, inorganic carbon compounds (e.g., graphite and carbonates), and mixtures thereof. In some embodiments, the amorphous inorganic coating material can be chosen from. $As_2S_3$, $BaCO_3$, $(BiO)_2CO_3$, $(Ca,Mg)CO_3$, $FeCO_3$, $PbCO_3$, $(PbCl)_2CO_3$, $PbCu(OH)_2(SO_4)$, $Sb_2S_3$, $SiO_2$, $SnS$, $SnS_2$, $Sn_2S_3$, $SrSO_4$, $SrCO_3$, $ZnCO_3$, aluminum silicate, aluminum phosphate, aluminum sulfate, barium phosphate, iron phosphate, barium sulfide, barium sulfate, bismuth sulfide, calcium oxalate, calcium silicate, calcium sulfide, calcium phosphate, calcium sulfate, calcium citrate, calcium tungstate, copper sulfide, graphite, iron sulfide, manganese carbonate, molybdenum disulfide, lithium iron(II) silicate, nickel carbonate, potassium silicate, strontium silicate aluminate, strontium sulfide, tungsten disulfide, zinc sulfide, zirconium (IV) silicate, and mixtures thereof.

In some embodiments, the inorganic coating material has a specific gravity of about 0.5-20, 2.7-5.1, 3.0-19, 4-18, 5-17, 5.5-16, 6-15, 6.5-14, 7-13, 8-12, or about 9-11 or about 0.5 or less, or about 0.6, 0.8, 1, 1.2, 1.4, 1.6, 1.8, 2, 2.2, 2.4, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.5, 6, 7, 8, 9, 10, 11, 12, 13, 14, 15, 16, 17, 18, 19, or about 20 or more.

Other Components.

The weighted composition including the coated weighting agent, or a mixture including the weighted composition, can include any suitable additional component in any suitable proportion, such that the coated weighting agent, weighted composition, or mixture including the same, can be used as described herein.

In some embodiments, the weighted composition includes one or more viscosifiers. The viscosifier can be any suitable viscosifier. The viscosifier can affect the viscosity of the weighted composition or a solvent that contacts the weighted composition at any suitable time and location. In some embodiments, the viscosifier provides an increased viscosity at least one of before injection into the subterranean formation, at the time of injection into the subterranean formation, during travel through a tubular disposed in a borehole, once the weighted composition reaches a particular subterranean location, or some period of time after the weighted composition reaches a particular subterranean location. In some embodiments, the viscosifier can be about 0.000,1 wt % to about 10 wt % of the weighted composition or a mixture including the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniummethyl acrylate halide, and trimethylammoniummethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstitued ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethyl-pentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the weighted composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the weighted composition or a mixture including the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the weighted composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyporchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the weighted composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The weighted composition, or a mixture including the weighted composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The weighted composition including the coated weighting agent or a mixture including the same can include any suitable downhole fluid. The weighted composition including the coated weighting agent can be combined with any suitable downhole fluid before, during, or after the placement of the weighted composition in the subterranean formation or the contacting of the weighted composition and the subterranean material. In some examples, the weighted composition including the coated weighting agent is combined with a downhole fluid above the surface, and then the combined composition is placed in a subterranean formation or contacted with a subterranean material. In another example, the weighted composition including the coated weighting agent is injected into a subterranean formation to combine with a downhole fluid, and the combined composition is contacted with a subterranean material or is considered to be placed in the subterranean formation. The placement of the weighted composition in the subterranean formation can include contacting the subterranean material and the mixture. Any suitable weight percent of the weighted composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the weighted composition or mixture including the same.

In some embodiments, the weighted composition, or a mixture including the same, can include any suitable amount of any suitable material used in a downhole fluid. For example, the weighted composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the weighted composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQ-UITONE™ polymeric filtration agent and viscosifier; FAC-TANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the weighted composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the weighted composition or mixture including the weighted composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A cement fluid can include an aqueous mixture of at least one of cement and cement kiln dust. The weighted composition including the coated weighting agent can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the weighted composition. For example, the weighted composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the weighted composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The weighted composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the weighted composition including the coated weighting agent disclosed herein can directly or indirectly affect one or more components or pieces of equipment associated with the preparation, delivery, recapture, recycling, reuse, and/or disposal of the disclosed weighting composition including coated weighting agent. For example, and with reference to FIG. 1, the disclosed weighted composition including coated weighting agent can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean foimations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The weighted composition including coated weighting agent can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the weighted composition including coated weighting agent can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the weighted composition including coated weighting agent can be stored, reconditioned, and/or regulated until added to the drilling fluid 122.

As mentioned above, the weighted composition including coated weighting agent can directly or indirectly affect the components and equipment of the drilling assembly 100. For example, the weighted composition including coated weighting agent can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the weighted composition including coated weighting agent.

The weighted composition including coated weighting agent can directly or indirectly affect the pump 120, which representatively includes any conduits, pipelines, trucks, tubulars, and/or pipes used to fluidically convey the weighted composition including coated weighting agent to the subterranean formation; any pumps, compressors, or motors (e.g., topside or downhole) used to drive the weighted composition into motion; any valves or related joints used to regulate the pressure or flow rate of the composition; and any sensors (e.g., pressure, temperature, flow rate, and the like), gauges, and/or combinations thereof, and the like. The weighted composition including coated weighting agent can also directly or indirectly affect the mixing hopper 134 and the retention pit 132 and their assorted variations.

The weighted composition including coated weighting agent can also directly or indirectly affect the various downhole or subterranean equipment and tools that can come into contact with the weighted composition including coated weighting agent such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The weighted composition including coated weighting agent can also directly or indirectly affect any downhole heat exchangers, valves and corresponding actuation devices, tool seals, packers and other wellbore isolation devices or components, and the like associated with the wellbore 116. The weighted composition including coated weighting agent can also directly or indirectly affect the drill bit 114, which can include roller cone bits, polycrystalline diamond compact (PDC) bits, natural diamond bits, hole openers, reamers, coring bits, and the like.

While not specifically illustrated herein, the weighted composition including coated weighting agent can also directly or indirectly affect any transport or delivery equipment used to convey the weighted composition including coated weighting agent to the drilling assembly 100 such as, for example, any transport vessels, conduits, pipelines, trucks, tubulars, and/or pipes used to fluidically move the weighted composition including coated weighting agent from one location to another, any pumps, compressors, or motors used to drive the weighted composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the weighted composition described herein in a subterranean formation, or that can perform or be generated by performance of a method for using the weighted composition described herein. The system can include a weighted composition including coated weighting agent, which can include a weighting agent and an inorganic coating material contacting the weighting agent. The system can also include a subterranean formation including the weighted composition therein. In some embodiments, the weighted composition in the system can also include a downhole fluid, or the system can include a mixture of the weighted composition and downhole fluid. In some embodiments, the system can include a tubular, and a pump configured to pump the weighted composition into the subterranean formation through the tubular.

In various embodiments, the weighted composition is a drill-in fluid. In various embodiments, the coated weighting agent includes an acid-treated iron oxide weighting agent and a crystalline inorganic coating material on the weighting agent chosen from barium sulfate, calcium carbonate, or a combination thereof.

Various embodiments provide systems and apparatus configured for delivering the weighted composition described herein to a subterranean location and for using the weighted composition therein, such as for a drilling operation (e.g., drilling into a production zone or reservoir), or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a weighted composition including the coated weighting agent described herein.

In some embodiments, the system can include a drill string disposed in a wellbore, with the drill string including a drill bit at a downhole end of the drill string. The system can also include an annulus between the drill string and the wellbore. The system can also include a pump configured to circulate the weighted composition through the drill string, through the drill bit, and back above-surface through the annulus. In some embodiments, the system can include a fluid processing unit configured to process the weighted composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the weighted composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the weighted composition to the high pressure pump. In such embodiments, the low pressure pump can "step up" the pressure of the weighted composition before it reaches the high pressure pump.

In some embodiments, the systems or apparatuses described herein can further include a mixing tank that is upstream of the pump and in which the weighted composition is formulated. In various embodiments, the pump (e.g., a low pressure pump, a high pressure pump, or a combination thereof) can convey the weighted composition from the mixing tank or other source of the weighted composition to the tubular. In other embodiments, however, the weighted composition can be formulated offsite and transported to a worksite, in which case the weighted composition can be introduced to the tubular via the pump directly from its shipping container (e.g., a truck, a railcar, a barge, or the like) or from a transport pipeline. In either case, the weighted composition can be drawn into the pump, elevated to an appropriate pressure, and then introduced into the tubular for delivery to the subterranean formation.

Figure 2:
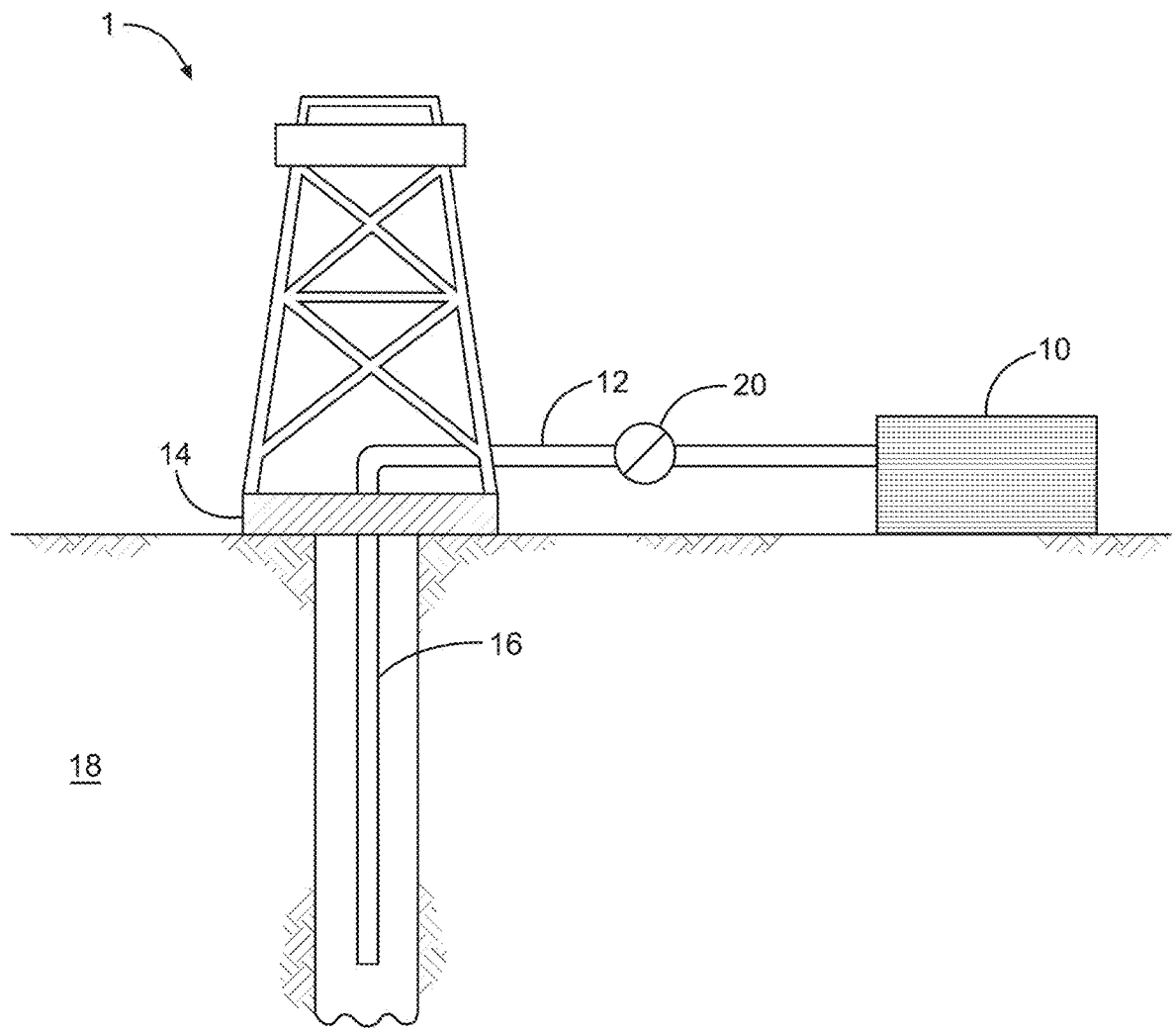
FIG. 2 illustrates a system or apparatus for delivering a weighted composition to a subterranean formation, in accordance with various embodiments.

FIG. 2 shows an illustrative schematic of systems and apparatuses that can deliver embodiments of the weighted compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the weighted composition can be formulated. The weighted composition can be conveyed via line 12 to wellhead 14, where the weighted composition enters tubular 16, with tubular 16 extending from wellhead 14 into subterranean formation 18. Upon being ejected from tubular 16, the weighted composition can subsequently penetrate into subterranean formation 18. Pump 20 can be configured to raise the pressure of the weighted composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the weighted composition can, in some embodiments, flow back to wellhead 14 and exit subterranean formation 18. The weighted composition that flows back can be substantially diminished in the concentration of coated weighting agent, or can have no coated weighting agent, therein. In some embodiments, the weighted composition that has flowed back to wellhead 14 can subsequently be recovered, and in some examples reformulated, and recirculated to subterranean formation 18.

It is also to be recognized that the disclosed weighted composition can also directly or indirectly affect the various downhole or subterranean equipment and tools that can come into contact with the weighted composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Coated Weighting Agent and Weighted Composition for Treatment of a Subterranean Formation.

Various embodiments provide a coated weighting agent for treatment of a subterranean formation. The coated weighting agent can be any embodiment of a coated weighting agent described herein, such as a coated weighting agent including a weighting agent and an inorganic coating material contacting the weighting agent.

Various embodiments provide a weighted composition for treatment of a subterranean formation. The weighted composition can be any suitable composition that includes a coated weighting agent described herein and that can be used to perform an embodiment of the method for treatment of a subterranean formation described herein.

In some embodiments, the weighted composition further includes a downhole fluid. The downhole fluid can be any suitable downhole fluid. In some embodiments, the downhole fluid is a composition for fracturing of a subterranean formation or subterranean material, or a fracturing fluid.

In some embodiments, the weighted composition is a composition for drilling of a subterranean formation. In some embodiments, the weighted composition is a drill-in fluid, for drilling into a production zone or reservoir.

In some embodiments, the coated weighting agent can include an iron oxide (e.g., hematite) weighting agent and an inorganic coating material thereon chosen from barium sulfate, calcium carbonate, and combinations thereof. In various embodiments, the iron oxide weighting agent in the coated weighting agent can be an acid-treated iron oxide.

Method of Preparing a Coated Weighting Agent or Weighted Composition for Treatment of a Subterranean Formation.

In various embodiments, the present invention provides a method of preparing a coated weighting agent for treatment of a subterranean formation, such as any coated weighting agent described herein. For example, the method can include forming a coated weighting agent including a weighting agent and an inorganic coating material contacting the weighting agent. In various embodiments, the present invention provides a method of preparing a weighted composition for treatment of a subterranean formation. The method can be any suitable method that produces a weighted composition described herein.

In some embodiments, the method can include growing the inorganic coating material on the weighting agent as one or more crystals. The term "growing," as used herein, refers to dissolved solute particles coming out of solution and crystallizing on a solid surface.

In some embodiments, the method can include using the weighting agent to seed crystallization of the coated weighting agent. The term "seed crystallization," as used herein, refers to providing a surface on which a dissolved solute can come out of solution and precipitate onto.

In various embodiments, the weighting agent in the coated weight agent is an acid-treated weighting agent. The method can include acid treating the weighting agent before forming the weighting agent or the weighted composition.

In some embodiments, the crystalline inorganic coating material comprises a first ion and a corresponding second counterion. The growing of the crystalline inorganic coating material on the weighting agent can include adding the weighting agent to a solution comprising water. The growing of the crystalline inorganic coating material can include adding a salt including the first ion of the crystalline inorganic coating material. The growing of the crystalline inorganic coating material can include adding a solution including a second corresponding counterion. The growing of the crystalline inorganic coating material can include forming the crystalline inorganic coating material on the weighting agent. In some embodiments, the growing of the crystalline inorganic coating material on the weighting agent can include treating the weighting agent with acid to form an acid-etched weighting agent. The growing of the crystalline inorganic coating material can include adding the acid-etched weighting agent to a solution including water. The growing of the crystalline inorganic coating material can include adding a salt including the first ion of the crystalline inorganic coating material. The growing of the crystalline inorganic coating material can include adding a solution including the second corresponding counterion. The growing of the crystalline inorganic coating material can include forming the crystalline inorganic coating material on the acid-etched weighting agent.

EXAMPLES

Various embodiments of the present invention can be better understood by reference to the following Examples which are offered by way of illustration. The present invention is not limited to the Examples given herein.

Example 1

Preparation and Analysis of Calcium Carbonate-Coated Iron Oxide Particles

Figure 3A:
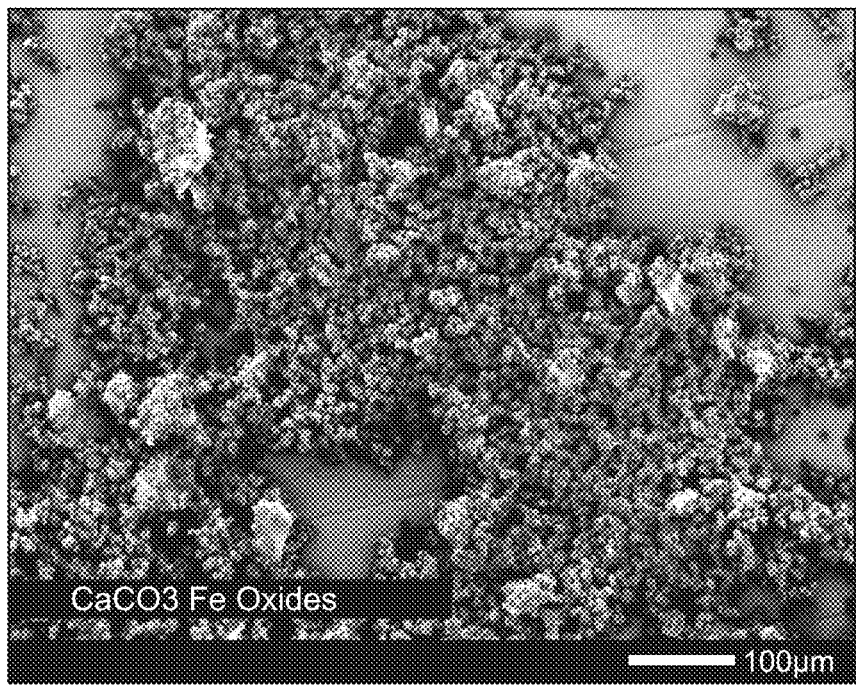
FIGS. 3A and 3B illustrate a scanning electron microscopy (SEM) image of calcium carbonate coated iron oxide particles at 150 times magnification and 6,500 times magnification, respectively, in accordance with various embodiments.
Figure 3B:
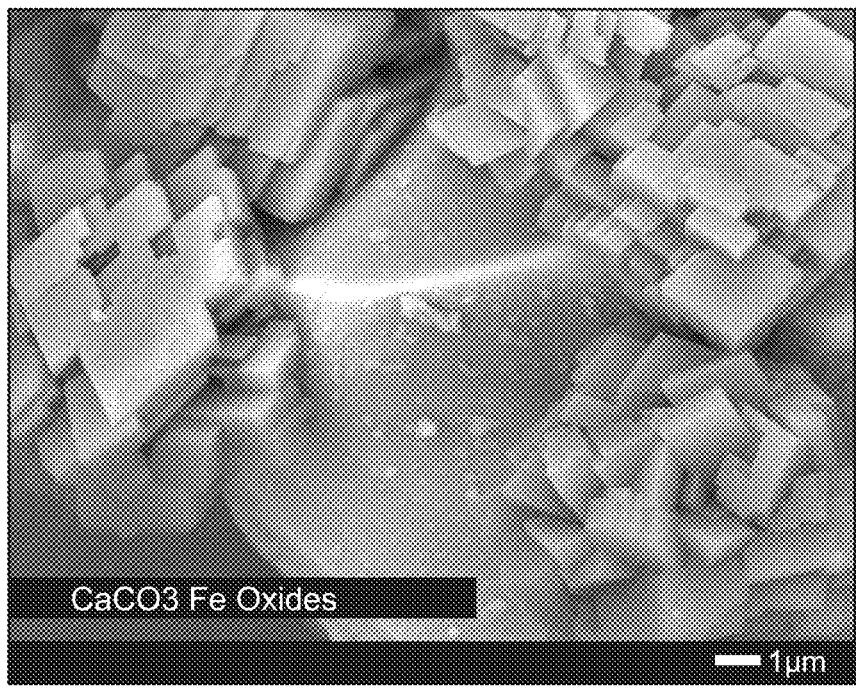

To 300 mL of deionized water, was added 100 g of hematite ($Fe_2O_3$). The solution was magnetically stirred at 700 rpm. Sodium carbonate (anhydrous, $Na_2CO_3$, 31.8 g, 0.30 mmol) was added to the solution and the mixture was allowed to stir for 5 minutes until the salt was totally dissolved. Subsequently, 6 M $CaCl_2$ solution was added at 5 mL/min with a total volume added of 50 mL, such that calcium and carbonate were present in an approximately equimolar ratio. At room temperature, for 10 mins, calcium carbonate crystals were allowed to grow on iron oxide particles. The iron oxide particles were successfully coated with 23 wt % $CaCO_3$. Scanning electron microscopy (SEM) was employed to analyze the $CaCO_3$-coated iron oxide particles. A SEM image at 150 times magnification is shown in FIG. 3A, and a SEM image at 6,500 times magnification is shown in FIG. 3B.

Example 2

Preparation and Analysis of Barite ($BaSO_4$)-Coated Iron Oxide Particles

Figure 4A:
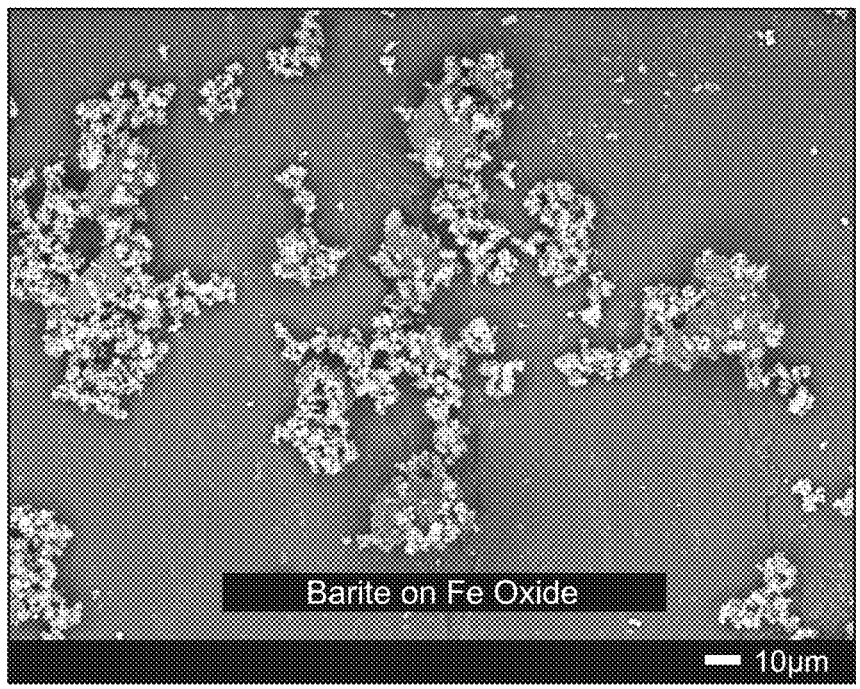
FIGS. 4A and 4B illustrate a SEM image of barite coated iron oxide particles, at 500 times magnification and 1,500 times magnification, respectively, in accordance with various embodiments.
Figure 4B:
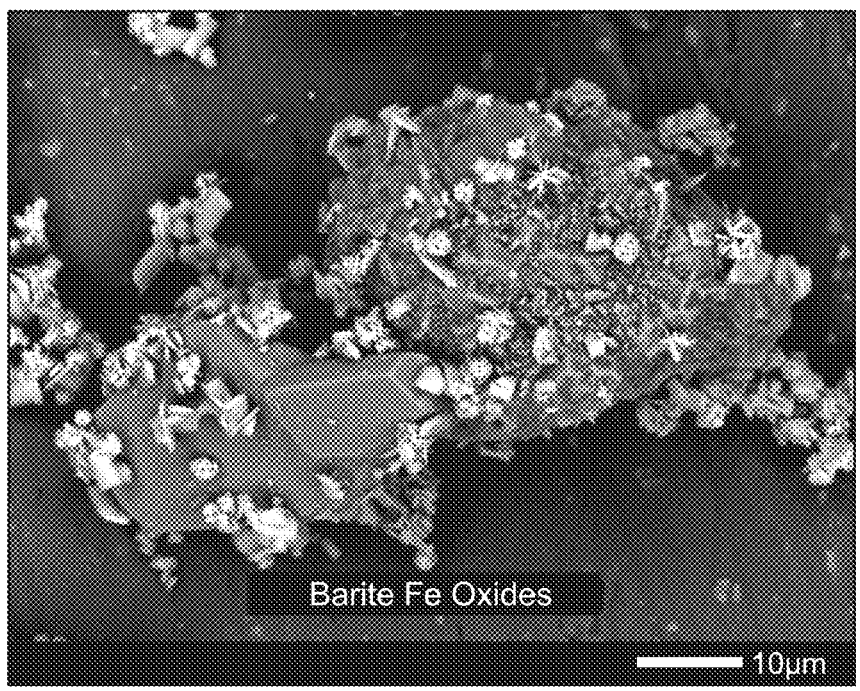

To 300 mL of deionized water, was added 2 g of hematite ($Fe_2O_3$). The solution was magnetically stirred at 700 rpm. A volume of 2.5 mL of aqueous 0.5 M $Na_2SO_4$ and 2.5 mL of aqueous 0.5 M aqueous $BaCl_2$ were each added simultaneously to the hematite suspension at 5 mL/h. At room temperature, for 30 min., barite crystals were then allowed to grow on iron oxide particles. The iron oxide particles were successfully coated with 12.7 wt % barite. SEM was employed to analyze the barite-coated iron oxide particles. A SEM image at 500 times magnification is shown in FIG. 4A, and a SEM image at 1,500 times magnification is shown in FIG. 4B.

Example 3

Preparation of Calcium Carbonate-Coated Iron Oxide Particles

Hematite (100 g) was added to 300 mL of deionized water. The solution was magnetically stirred at 700 rpm. Sodium carbonate ($Na_2CO_3$, 31.8 g, 24.9 g, 20.5 g, 18.4 g) was added to the solution and the mixture was allowed to stir for 5 minutes until the salt was totally dissolved. Subsequently, a 6 M aqueous $CaCl_2$ solution was added at 5 mL/min with a total volume added of 50 mL, 39.1 mL, 34.0 mL, or 30.7 mL, such that calcium and carbonate were present in an approximately equimolar ratio. At room temperature, calcium carbonate crystals were then allowed to grow on iron oxide particles. The iron oxide particles were successfully coated with $CaCO_3$, forming particles having 23 wt %, 19 wt %, 17 wt %, or 15.5 wt % $CaCO_3$, as shown in Table 1.

TABLE 1

Calcium-carbonate coated iron oxide particles.

| Sample | Hematite | $Na_2CO_3$ | 0.5M $CaCl_2$ | Wt % $CaCO_3$ in coated particles | Specific gravity of coated particles |
|---|---|---|---|---|---|
| 3-1 | 100 g | 31.8 g | 50 mL | 23 wt % | 4.18 |
| 3-2 | 100 g | 24.9 g | 39.1 mL | 19 wt % | 4.27 |
| 3-3 | 100 g | 20.5 g | 34.0 mL | 17 wt % | 4.34 |
| 3-4 | 100 g | 18.4 g | 30.7 mL | 15.5 wt % | 4.39 |

Example 4

Imaging of $CaCO_3$-Coated Particles

Figure 5A:
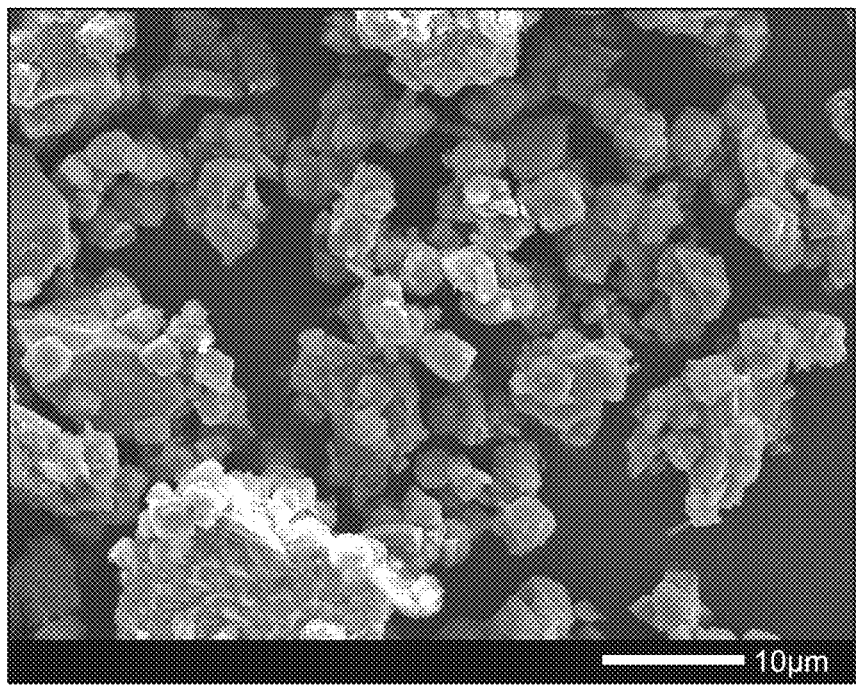
FIGS. 5A-B illustrate SEM images of 23 wt % $CaCO_3$-coated hematite particles, formed from acid-treated hematite, in accordance with various embodiments.
Figure 5B:
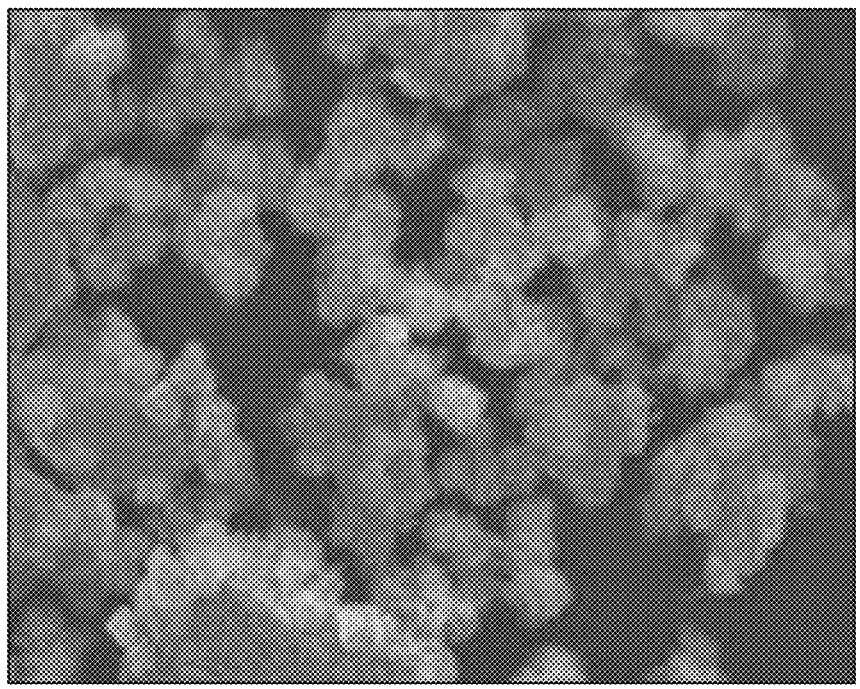
Figure 5C:
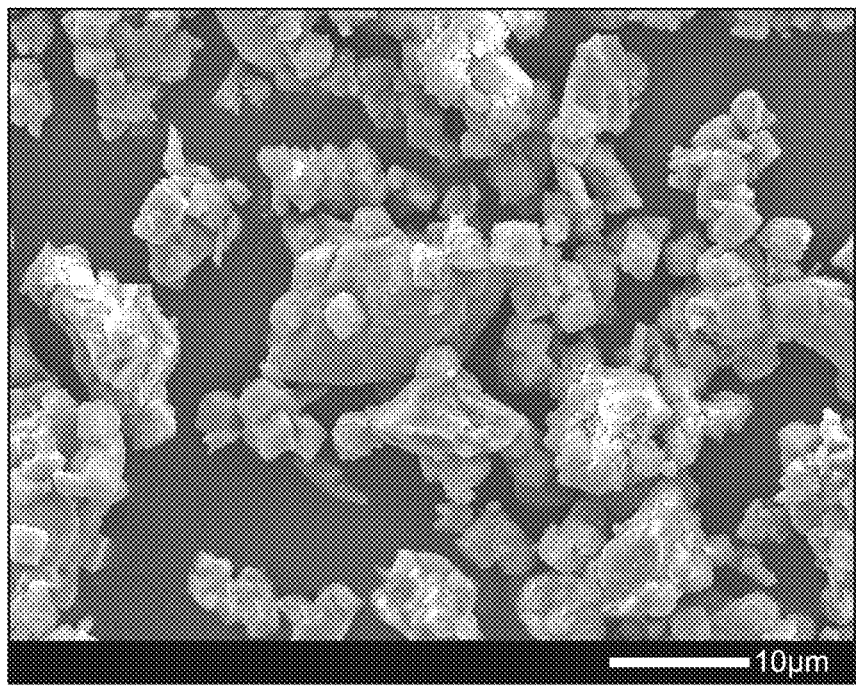
FIGS. 5C-D illustrate SEM images of 23 wt % $CaCO_3$-coated hematite particles, formed from acid-treated hematite, in accordance with various embodiments.
Figure 5D:
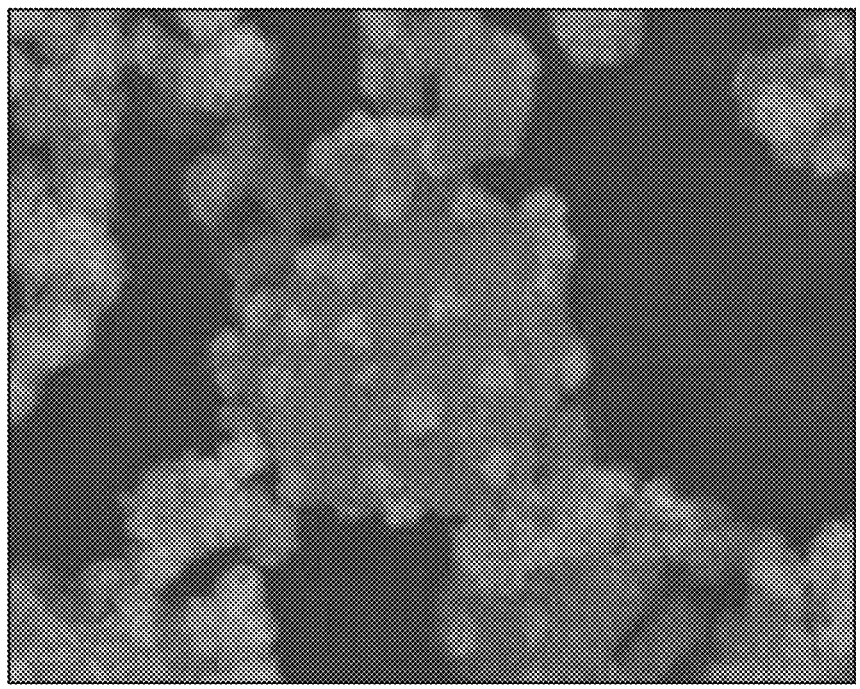
Figure 5E:
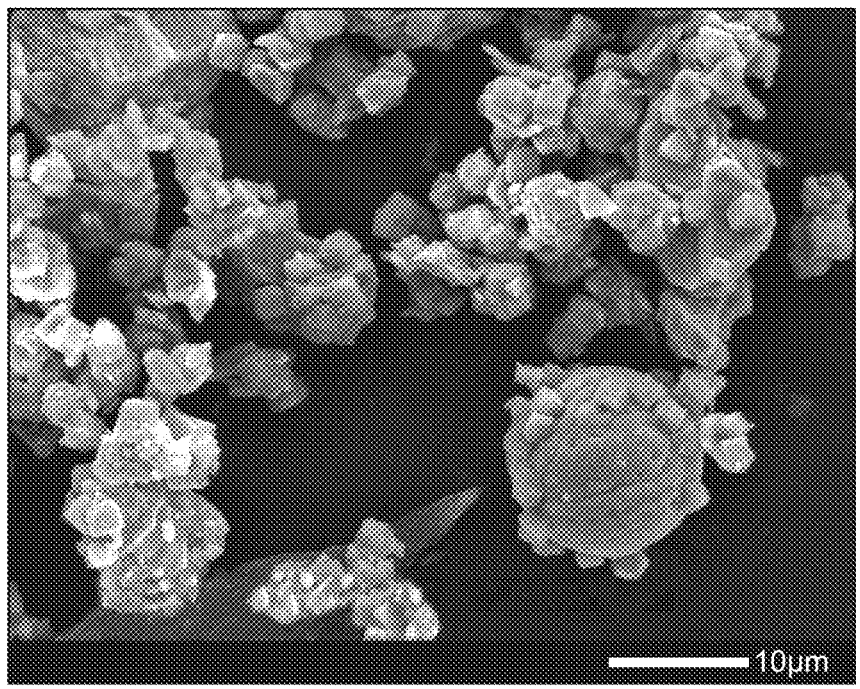
FIGS. 5E-F illustrate SEM images of 23 wt % $CaCO_3$-coated hematite particles, formed from acid-treated hematite, in accordance with various embodiments.
Figure 5F:
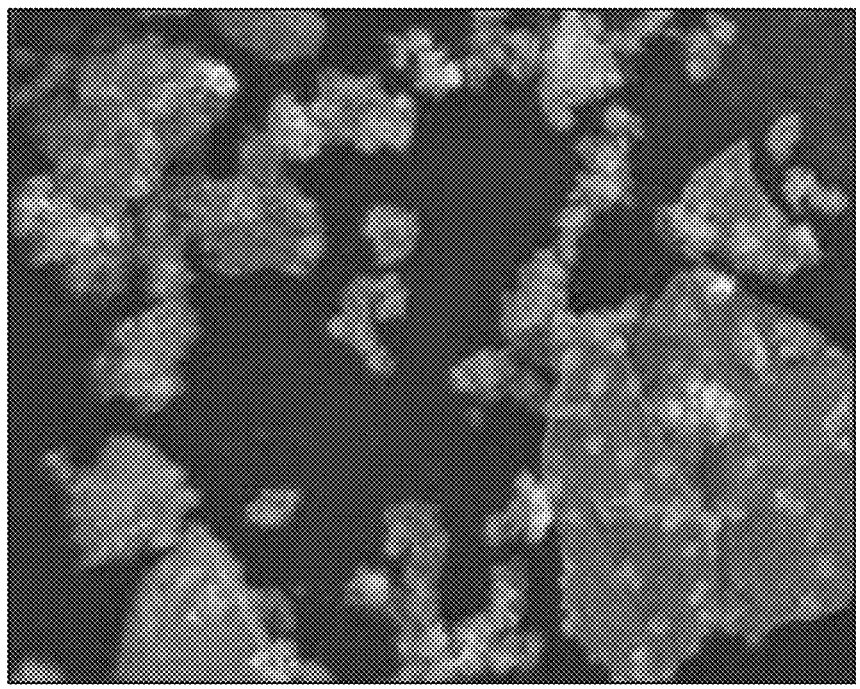
Figure 5G:
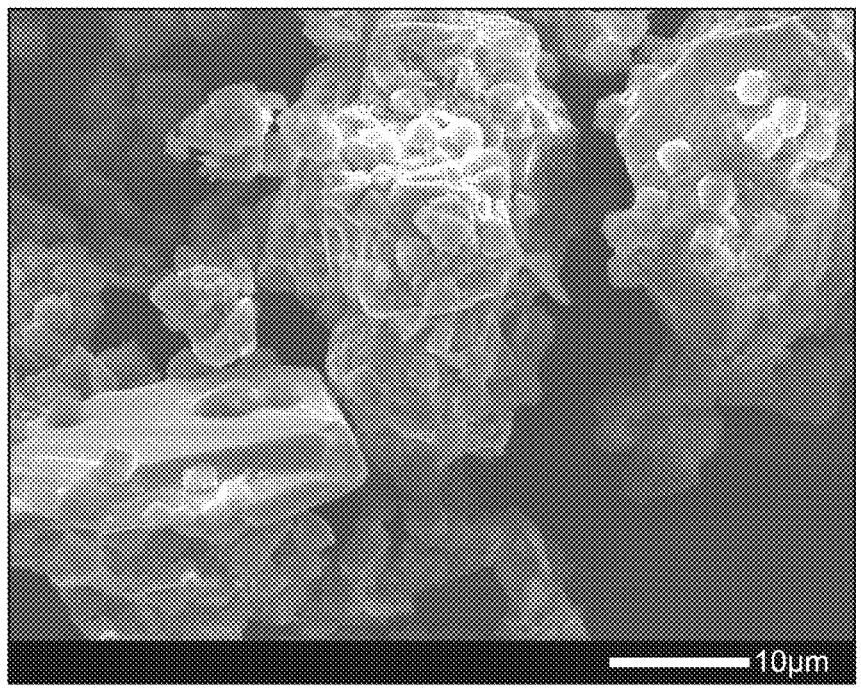
FIGS. 5G-H illustrate SEM images of 23 wt % $CaCO_3$-coated hematite particles, formed from acid-treated hematite, in accordance with various embodiments.
Figure 5H:
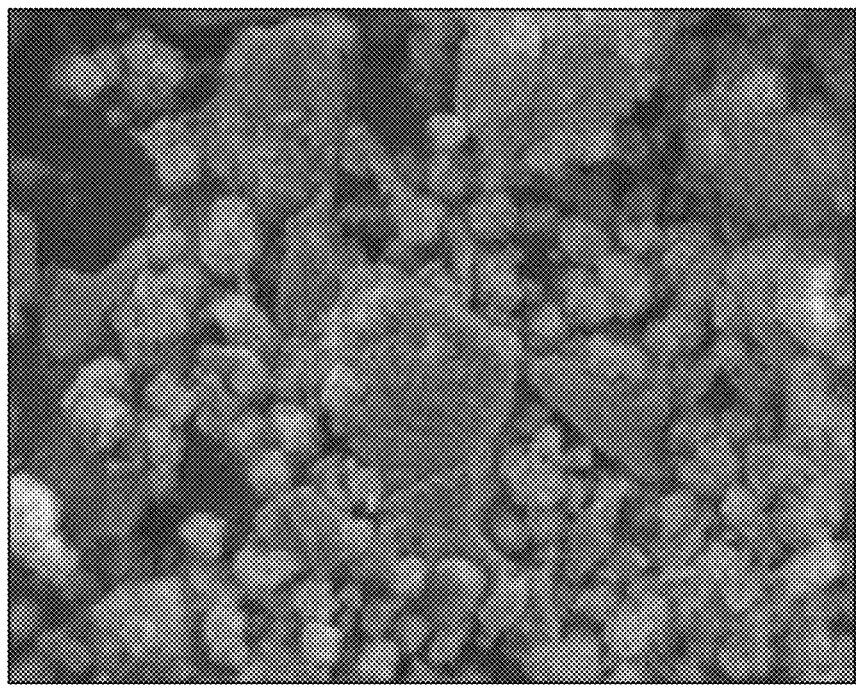

SEM images of the 23 wt %, 19 wt %, 17 wt %, and 15.5 wt % $CaCO_3$-coated particles of Example 3 are shown in FIGS. 5A-B, C-D, E-F, and G-H, respectively. The images shown in FIGS. 5A, C, E, and G have normal shading, and the images shown in FIGS. 5B, D, F, and H have shading that illustrates the difference between hematite (darker) and $CaCO_3$ (lighter).

Example 5

Figure 6:
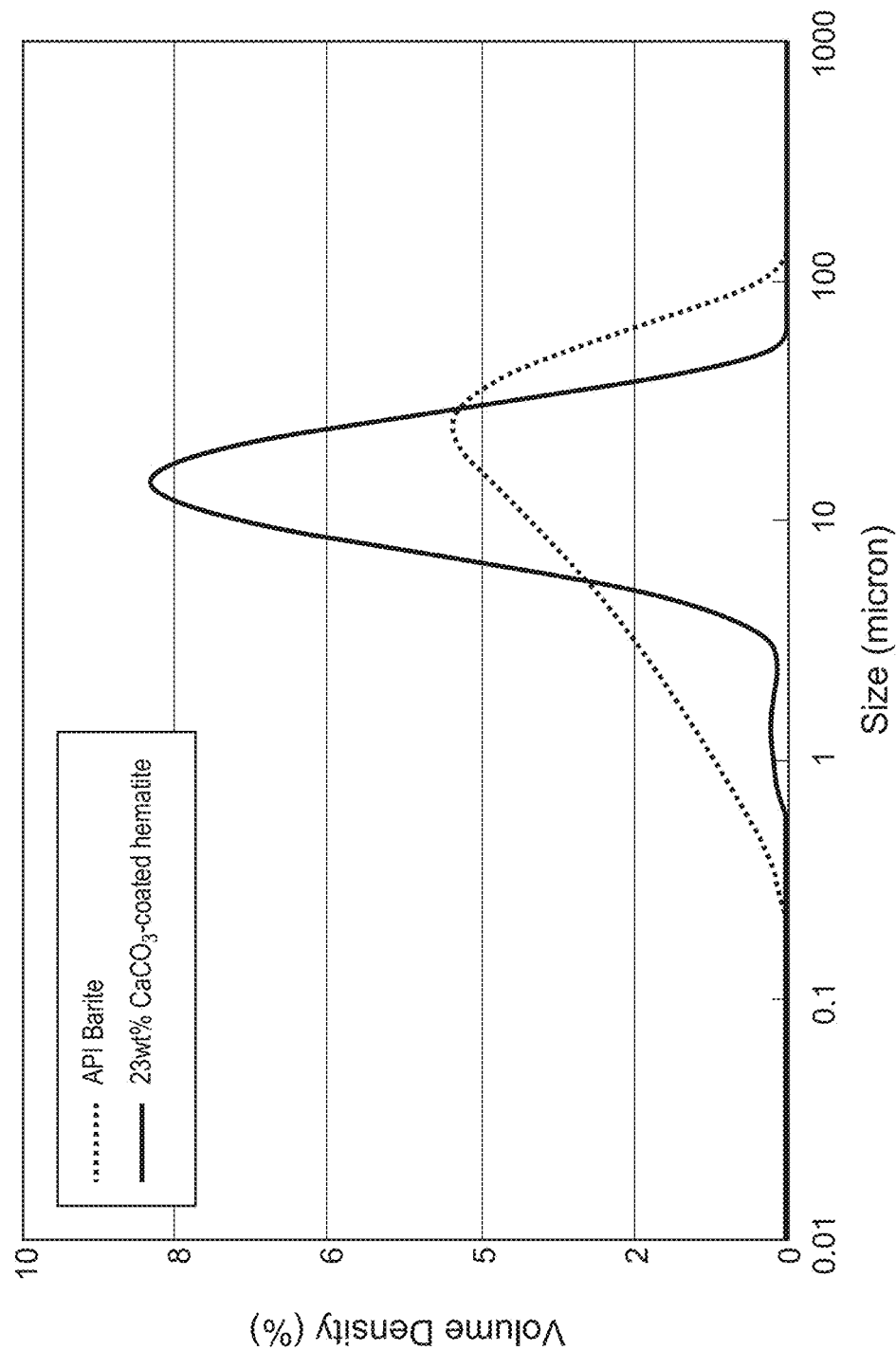
FIG. 6 illustrates volume density versus size of barite and 23 wt % $CaCO_3$-coated hematite, in accordance with various embodiments.

Particle Size Analysis of 23 wt % $CaCO_3$-Coated Particles and Comparison to Hematite and Barite The particle size distribution of hematite, the 23 wt % $CaCO_3$-coated particles of Example 3, and of ground barite (which met American Petroleum Institute specification 13/ISO 13500, and had a specific gravity of 4.2), was analyzed using the wet dispersion method on a Malvern Mastersizer 3000, which measures particle size distribution using light scattering. The results are given in FIG. 6 and Table 2. The apparent D value diameters (e.g., D10, D50, and D90) indicate the mass percentage of the sample that is smaller than the apparent D values. For example, the D10 diameter represents the diameter at which 10% of the sample's mass has a smaller diameter.

TABLE 2

Particle size distribution of the 23 wt % $CaCO_3$-coated particles of Example 3.

| Apparent D values | Uncoated hematite of Example 3 | 23 wt % $CaCO_3$-coated hematite of Example 3 | API ground barite |
|---|---|---|---|
| D10 | 1.79 μm | 7.13 μm | 1.89 μm |
| D50 | 15.3 μm | 15.9 μm | 14.4 μm |
| D90 | 35.9 μm | 34.7 μm | 50.7 μm |

Example 6

Figure 7:
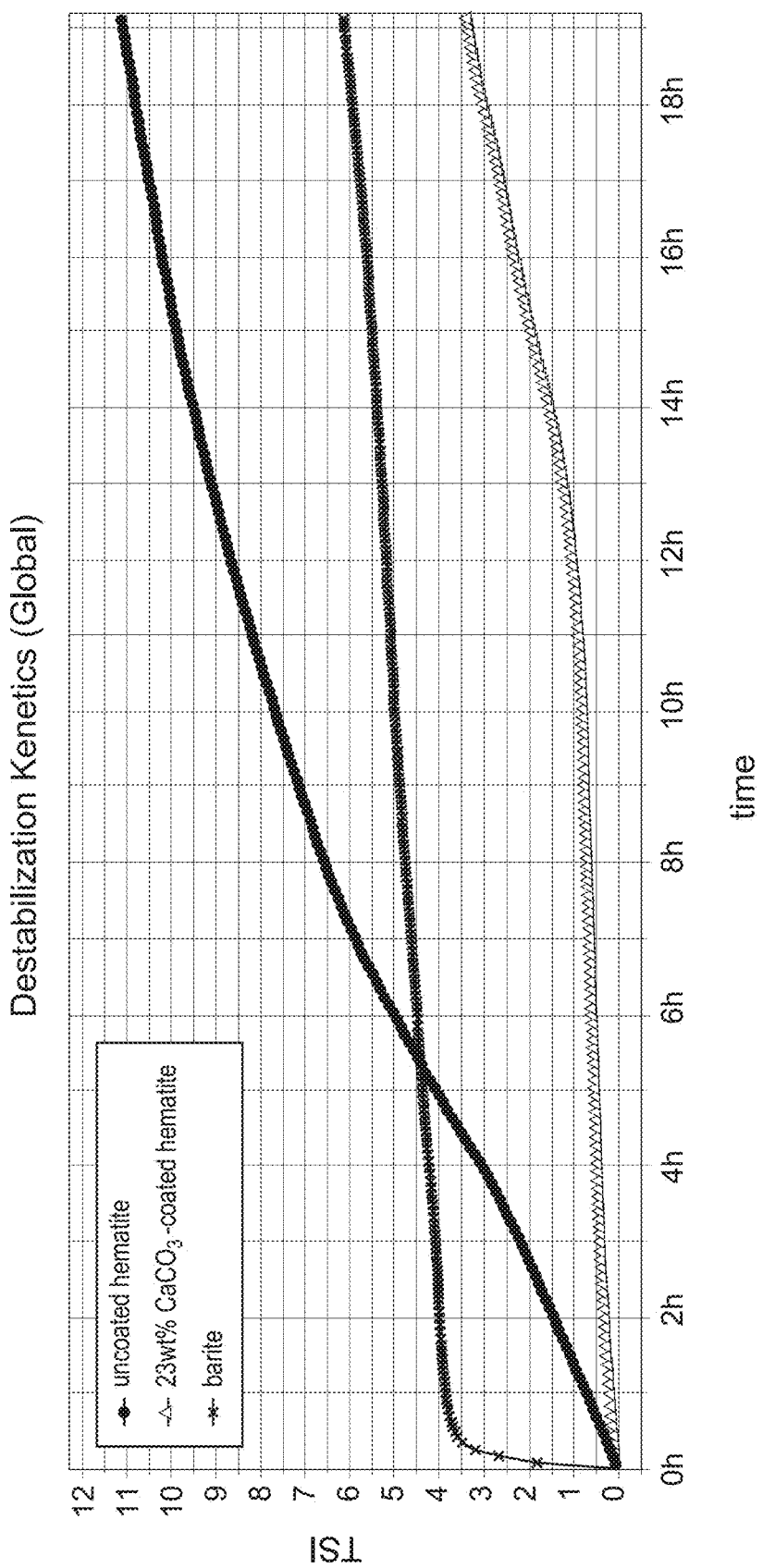
FIG. 7 illustrates the Turbiscan Stability Index (TSI) as a function of time for acid-treated hematite, 23 wt % $CaCO_3$-coated particles, and barite, in accordance with various embodiments.

Settling Properties of 23 wt % $CaCO_3$-Coated Particles Compared to Hematite and Barite A sag experiment was performed on the hematite, the 23 wt % $CaCO_3$-coated particles of Example 3, and on the barite of Example 6 with a Turbiscan sedimentometer with 12 pounds per gallon (ppg) oil-based muds (OBMs). The Turbiscan™ used a light source of 800 nm wavelength to scan the sample in static sag condition. FIG. 7 illustrates the Turbiscan Stability Index (TSI) as a function of time for the OBMs at 80° C. Higher TSI value indicates faster sedimentation of solid in the mud under static condition. Clearly, the mud using the $CaCO_3$ coated hematite as weighting agent has much slower static sag compared to that using API ground barite as weighting agent.

Example 7

Imaging of Differences Caused by Acid Treatment

Hematite (200 g, $Fe_2O_3$) was added into 400 mL 30 wt % $H_3PO_4$. The suspension was magnetically stirred at 400 rpm at room temperature overnight. The acid-treated hematite was then filtered and washed with DI water to completely remove the acid. It dried in oven at 150° F. for 5 hrs.

To 300 mL of deionized water, was added 100 g of the acid-treated hematite ($Fe_2O_3$). The solution was magnetically stirred at 700 rpm. Sodium carbonate (anhydrous, $Na_2CO_3$, 31.8 g, 0.30 mmol) was added to the solution and the mixture was allowed to stir for 5 minutes until the salt was totally dissolved. Subsequently, 6 M $CaCl_2$ solution was added at 5 mL/min with a total volume added of 50 mL, such that calcium and carbonate were present in an approximately equimolar ratio. At room temperature, for 10 mins, calcium carbonate crystals were allowed to grow on iron oxide particles. The iron oxide particles were successfully coated with 23 wt % $CaCO_3$.

Figure 8:
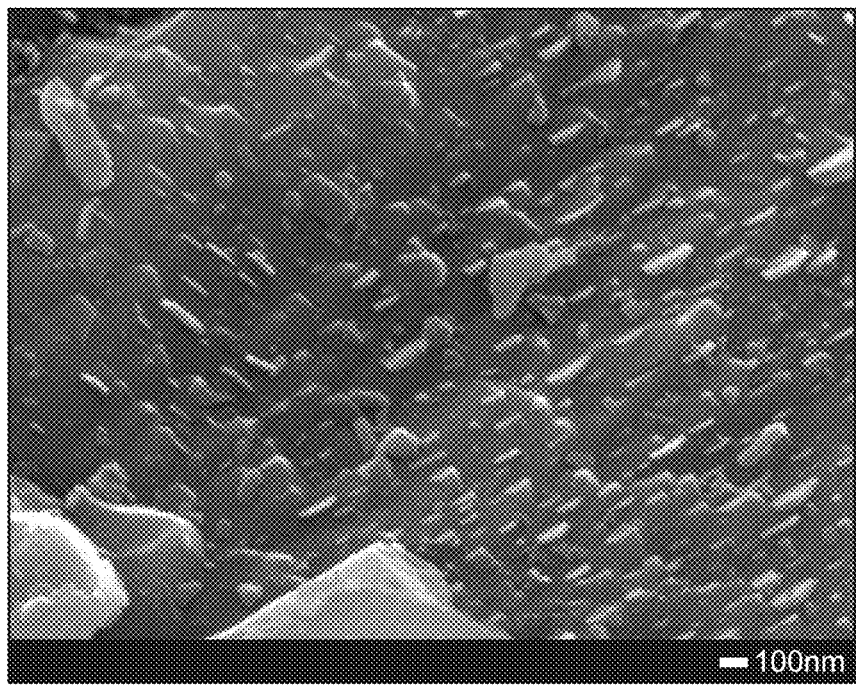
FIG. 8 illustrates a SEM image of the $CaCO_3$-coated particles of Example 1, in accordance with various embodiments.
Figure 9A:
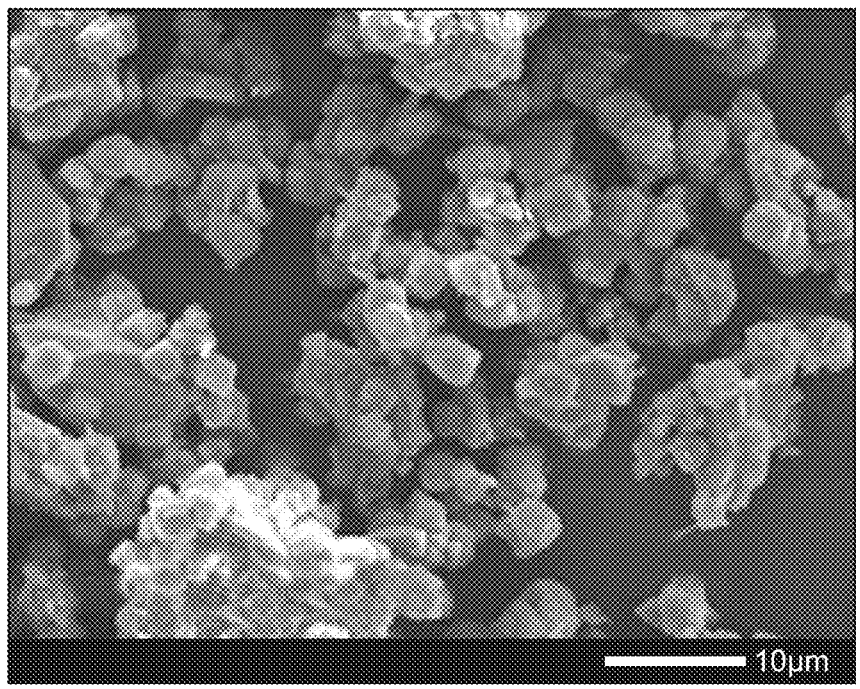
FIGS. 9A-C illustrate SEM images of 23 wt % $CaCO_3$-coated hematite, formed from acid-treated hematite, in accordance with various embodiments.
Figure 9B:
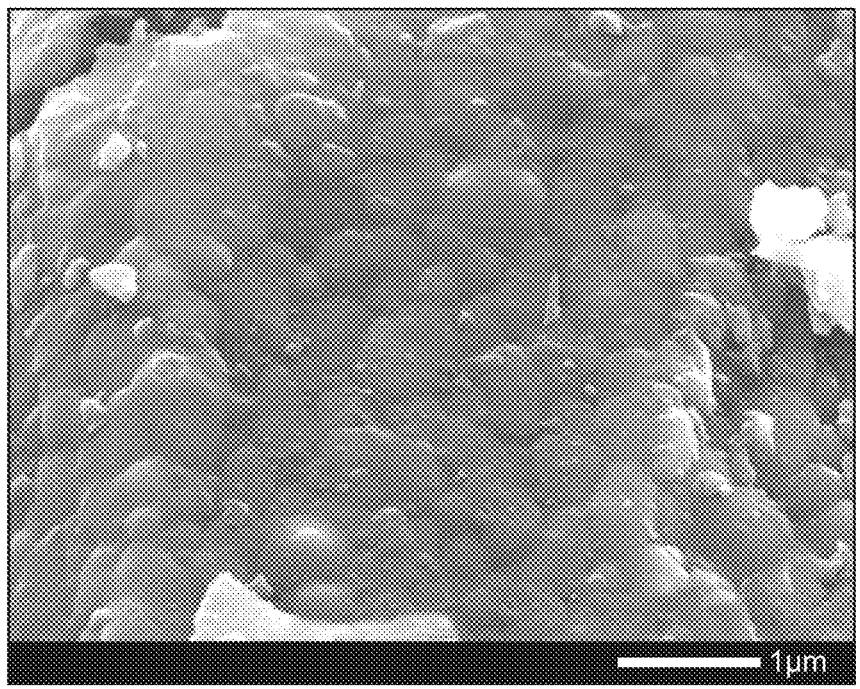
Figure 9C:

A SEM image of the $CaCO_3$-coated particles of Example 1 was generated and is shown in FIG. 8, illustrating the sharp edges of the hematite crystals on a smooth crystal surface. SEM images of the 23 wt % $CaCO_3$-coated particles formed from acid-treated hematite, are shown in FIGS. 9A-C, illustrating a rougher hematite surface that is substantially free of sharp crystal edges. The acid-etched hematite crystals were observed to grow crystals on a greater proportion of the overall surface area, as compared to un-etched crystals which tended to 1) lack crystals on sharp edges of the hematite, and also 2) have sparse crystals on smooth crystal surfaces.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in the subterranean formation a weighted composition comprising a coated weighting agent comprising
a weighting agent; and
an inorganic coating material on the weighting agent.

Embodiment 2 provides the method of Embodiment 1, wherein the method further comprises obtaining or providing the weighted composition, wherein the obtaining or providing of the weighted composition occurs above-surface.

Embodiment 3 provides the method of any one of Embodiments 1-2, wherein the method further comprises obtaining or providing the weighted composition, wherein the obtaining or providing of the weighted composition occurs in the subterranean formation.

Embodiment 4 provides the method of any one of Embodiments 1-3, wherein the weighted composition is a drilling fluid.

Embodiment 5 provides the method of any one of Embodiments 1-4, wherein the weighted composition is a drill-in fluid.

Embodiment 6 provides the method of any one of Embodiments 1-5, further comprising drilling into a production zone or reservoir in the subterranean formation using the weighted composition as a drill-in fluid.

Embodiment 7 provides the method of any one of Embodiments 1-6, further comprising cleaning the coated weighting agent from the production zone or reservoir after drilling into the production zone or reservoir, the cleaning comprising at least partially dissolving the coated weighting agent with an acidic solution.

Embodiment 8 provides the method of any one of Embodiments 1-7, wherein the coated weighting agent has a greater surface roughness than the weighting agent.

Embodiment 9 provides the method of any one of Embodiments 1-8, wherein the coated weighting agent has about 101% to about 100,000% of the surface area of the weighting agent.

Embodiment 10 provides the method of any one of Embodiments 1-9, wherein the coated weighting agent has about 110% to about 10,000% of the surface area of the weighting agent.

Embodiment 11 provides the method of any one of Embodiments 1-10, wherein the coated weighting agent experiences greater drag in the weighted composition than the weighting agent in a corresponding composition that is free of the coated weighting agent.

Embodiment 12 provides the method of any one of Embodiments 1-11, wherein the coated weighting agent is a homogeneous suspension in the weighted composition.

Embodiment 13 provides the method of Embodiment 12, wherein the coated weighting agent does not settle out of the suspension under static conditions.

Embodiment 14 provides the method of any one of Embodiments 12-13, wherein the coated weighting agent settles out of the suspension under static conditions more slowly than a suspension of the weighting agent in a corresponding composition that is free of the coated weighting agent under static conditions.

Embodiment 15 provides the method of any one of Embodiments 1-14, wherein the weighting agent is an acid-treated weighting agent.

Embodiment 16 provides the method of Embodiment 15, wherein the acid-treated weighting agent has greater surface area than a corresponding weighting agent not treated with acid.

Embodiment 17 provides the method of any one of Embodiments 15-16, wherein the acid-treated weighting agent has a greater surface roughness than a surface roughness of a corresponding weighting agent not treated with acid.

Embodiment 18 provides the method of any one of Embodiments 15-17, wherein the acid-treated weighting agent has greater concentration of inorganic coating material-seeding sites than the concentration of such seeding sites on a corresponding weighting agent not treated with acid.

Embodiment 19 provides the method of any one of Embodiments 1-18, wherein the weighting agent is selected from the group consisting of hard minerals, metal oxides, metal particles, metal alloys, and combinations thereof.

Embodiment 20 provides the method of any one of Embodiments 1-19, wherein the weighting agent is selected from the group consisting of $Al_2O_3$, $Al_2SiO_5$, $BiO_3$, $Bi_2O_3$, $CaSO_4$, $CaPO_4$, $CdS$, $Ce_2O_3$, $(Fe,Mg)Cr_2O_4$, $Cr_2O_3$, $CuO$, $Cu_2O$, $Cu_2(AsO_4)(OH)$, $CuSiO_3.H_2O$, $Fe_3Al_2(SiO_4)_3$, $Fe^{2+}Al_2O_4$, $Fe_2SiO_4$, $FeCO_3$, $Fe_2O_3$, $\alpha$-$Fe_2O_3$, $\alpha$-$FeO(OH)$, $Fe_3O_4$, $FeTiO_3$, $(Fe,Mg)SiO_4$, $(Mn,Fe,Mg)(Al,Fe)_2O_4$, $CaFe^{2+}_2Fe^{3+}Si_2O_7O(OH)$, $(YFe^{3+}Fe^{2+}U,Th, Ca)_2(Nb,Ta)_2O_8$, $MgO$, $Mn_2SiO_4$, $Mn(II)_3Al_2(SiO_4)_3$, $(Na_{0.3}Ca_{0.1}K_{0.1})(Mn^{4+},Mn^{3+})_2O_4.1.5\ H_2O$, $(Mn,Fe)_2O_3$, $(Mn^{2+},Fe^{2+},Mg)(Fe^{3+},Mn^{3+})_2O_4$, $(Mn^{2+},Mn^{3+})_6[(O_8)(SiO_4)]$, $Ca(Mn^{3+},Fe^{3+})_{14}SiO_{24}$, $Ba(Mn^{2+})(Mn^{4+})_8O_{16}(OH)_4$, $CaMoO_4$, $MoO_2$, $MoO_3$, $NbO_4$, $(Na,Ca)_2Nb_2O_6(OH,F)$, $(Y,Ca,Ce,U,Th)(Nb,Ta,Ti)_2O_6$, $(Y,Ca,Ce,U,Th)(Ti,Nb,Ta)_2O_6$, $(Fe,Mn)(Ta,Nb)_2O_6$, $(Ce,La,Ca)BSiO_5$, $(Ce,La)CO_3F$, $(Y,Ce)CO_3F$, $MnO$, $MnO_2$, $Mn_2O_3$, $Mn_3O_4$, $Mn_2O_7$, $MnO(OH)$, $(Mn^{2+},Mn^{3+})_2O_4$, $NiO$, $NiAs_2$, $NiAs$, $NiAsS$, $Ni_2Fe$ to $Ni_3Fe$, $(Ni,Co)_3S_4$, $PbSiO_3$, $PbCO_3$, $(PbCl)_2CO_3$, $Pb^{2+}2Pb^{4+}O4$, $PbCu[(OH)_2(SO_4)]$, $(Sb^{3+},Sb^{5+})O_4$, $Sb_2SnO_5$, $Sc_2O_3$, $SnO$, $SnO_2$, $Cu_2FeSnS_4$, $SrO$, $SrSO_4$, $SrCO_3$, $(Na,Ca)_2Ta_2O_6(O,OH,F)$, $ThO_2$, $(Th,U)SiO_4$, $TiO_2$, $UO_2$, $V_2O_3$, $VO_2$, $V_2O_5$, $Pb_5(VO_4)_3Cl$, $VaO$, $Y_2O_3$, $ZnCO_3$, $ZnO$, $ZnFe_2O_4$, $ZnAl_2O_4$, $ZnCO_3$, $ZnO$, $ZrSiO_4$, $ZrO_2$, $ZrSiO_4$, allemontite, altaite, aluminum oxide, anglesite, tin oxide, antimony trioxide, awaruite, barium sulfate, bastnaesite, beryllium oxide, birnessite, bismite, bismuth oxycarbonates, bismuth oxychloride, bismuth trioxide, bismuth (III) oxide, bixbyite, bournonite, braunite, brucite, cadimum sulfide, calayerite, calcium oxide, calcium carbonate, cassiterite, cerium oxide, cerussite, chromium oxide, clinoclase, columbite, copper, copper oxide, corundum, crocoite, cuprite, dolomite, euxenite, fergusonite, franklinite, gahnite, geothite, greenockite, hausmmanite, hematite, hercynite, hessite, ilvaite, Jacobsite, magnesium oxide, manganite, manganosite, magnetite, manganese dioxide, manganese (IV) oxide, manganese oxide, manganese tetraoxide, manganese (II) oxide, manganese (III) oxide, microlite, minium, molybdenum (IV) oxide, molybdenum oxide, molybdenum trioxide, nickel oxide, pearceite, phosgenite, psilomelane, pyrochlore, pyrolusite, rutile, scandium oxide, siderite, smithsonite, spessartite, stillwellite, stolzite, strontium oxide, tantalite, tenorite, tephroite, thorianite, thorite, tin dioxide, tin (II) oxide, titanium dioxide, vanadium oxide, vanadium trioxide, vanadium (IV) oxide, vanadium (V) oxide, witherite, wulfenite, yttrium oxide, zincite, zircon, zirconium oxide, zirconium silicate, zinc oxide, and combinations thereof.

Embodiment 21 provides the method of any one of Embodiments 1-20, wherein the weighting agent is selected from the group consisting of iron, nickel, and combinations thereof.

Embodiment 22 provides the method of any one of Embodiments 1-21, wherein the inorganic coating material is a crystalline inorganic coating material.

Embodiment 23 provides the method of Embodiment 22, wherein the crystalline inorganic coating material is selected from the group consisting of calcium salts, barium salts, bismuth salts, aluminum salts, sodium salts, potassium salts, iron salts, nickel salts, cadmium salts, cesium salts, strontium salts, magnesium salts, zinc salts, lead salts, and mixtures thereof.

Embodiment 24 provides the method of any one of Embodiments 22-23, wherein the crystalline inorganic coating material is selected from the group consisting of $As_2S_3$, $BaCO_3$, $(BiO)_2CO_3$, $(Ca,Mg)CO_3$, $FeCO_3$, $PbCO_3$, $(PbCl)_2CO_3$, $PbCu(OH)_2(SO_4)$, $Sb_2S_3$, $SnS$, $SnS_2$, $Sn_2S_3$, $SrSO_4$, $SrCO_3$, $ZnCO_3$, ankerite, aluminum phosphate, aluminum sulfate, barium phosphate, iron phosphate, barium sulfide, barium sulfate, beryllium sulfide, bismuth sulfide, calcium oxalate, calcium sulfide, calcium phosphate, calcium sulfate, calcium citrate, calcium carbonate, calcite, aragonite, manganese carbonate, gaspite, huntite, magnesite, nickel carbonate, strontium sulfide, thallium sulfide, and mixtures thereof.

Embodiment 25 provides the method of any one of Embodiments 1-24, wherein the inorganic coating material is an amorphous inorganic coating material.

Embodiment 26 provides the method of Embodiment 25, wherein the amorphous inorganic coating material is selected from the group consisting of phosphates, carbonates, silicates, tungstates, molybdates, aluminates, titanates, sulfides, oxides, hydroxides, silicates, silica, inorganic carbon compounds, and mixtures thereof.

Embodiment 27 provides the method of any one of Embodiments 25-26, wherein the amorphous inorganic coating material is selected from the group consisting of $As_2S_3$, $BaCO_3$, $(BiO)_2CO_3$, $(Ca,Mg)CO_3$, $FeCO_3$, $PbCO_3$, $(PbCl)_2CO_3$, $PbCu(OH)_2(SO_4)$, $Sb_2S_3$, $SiO_2$, $SnS$, $SnS_2$, $Sn_2S_3$, $SrSO_4$, $SrCO_3$, $ZnCO_3$, aluminum silicate, aluminum phosphate, aluminum sulfate, barium phosphate, iron phosphate, barium sulfide, barium sulfate, bismuth sulfide, calcium oxalate, calcium silicate, calcium sulfide, calcium phosphate, calcium sulfate, calcium citrate, calcium tungstate, copper sulfide, graphite, iron sulfide, manganese carbonate, molybdenum disulfide, lithium iron(II) silicate, nickel carbonate, potassium silicate, strontium silicate aluminate, strontium sulfide, tungsten disulfide, zinc sulfide, zirconium (IV) silicate, and mixtures thereof.

Embodiment 28 provides the method of any one of Embodiments 1-27, wherein the coated weighting agent has a higher specific gravity than the inorganic coating material.

Embodiment 29 provides the method of any one of Embodiments 1-28, wherein the coated weighting agent has a lower specific gravity than the weighting agent.

Embodiment 30 provides the method of any one of Embodiments 1-29, wherein the weighting agent is at least partially acid-soluble.

Embodiment 31 provides the method of any one of Embodiments 1-30, wherein the inorganic coating material is at least partially acid-soluble.

Embodiment 32 provides the method of any one of Embodiments 1-31, wherein the coated weighting agent is at least partially acid-soluble.

Embodiment 33 provides the method of any one of Embodiments 1-32, wherein the coated weighting agent has a particle size of about 0.1 µm to about 1,000 µm.

Embodiment 34 provides the method of any one of Embodiments 1-33, wherein the coated weighting agent has a particle size of at least about 0.1 µm.

Embodiment 35 provides the method of any one of Embodiments 1-34, wherein the coated weighting agent is less abrasive than a corresponding weighting agent that is free of the inorganic coating material.

Embodiment 36 provides the method of any one of Embodiments 1-35, wherein the coated weighting agent has a specific gravity of at least about 2.6.

Embodiment 37 provides the method of any one of Embodiments 1-36, wherein the coated weighting agent has a specific gravity of about 3 to about 20.

Embodiment 38 provides the method of any one of Embodiments 1-37, wherein the inorganic coating material is about 1 wt % to about 50 wt % of the coated weighting agent.

Embodiment 39 provides the method of any one of Embodiments 1-38, wherein the inorganic coating material is about 1 wt % to about 10 wt % of the coated weighting agent.

Embodiment 40 provides the method of any one of Embodiments 1-39, wherein the inorganic coating material coats about 10% to about 50% of the surface of the weighting agent.

Embodiment 41 provides the method of any one of Embodiments 1-40, wherein the inorganic coating material coats about 50% to about 100% of the surface of the weighting agent.

Embodiment 42 provides the method of any one of Embodiments 1-41, wherein the viscosity of the weighted composition is different than that of a corresponding composition that is free of the coated weighting agent.

Embodiment 43 provides the method of any one of Embodiments 22-42, further comprising growing the crystalline inorganic coating material on the weighting agent.

Embodiment 44 provides the method of any one of Embodiments 22-43, wherein the coated weighting agent is made by a process of growing crystals of the crystalline inorganic coating material on the weighting agent.

Embodiment 45 provides the method of any one of Embodiments 1-44, further comprising combining the weighted composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the weighted composition in the subterranean formation comprises placing the mixture in the subterranean formation.

Embodiment 46 provides the method of Embodiment 45, wherein the cementing fluid comprises Portland cement, pozzolana cement, gypsum cement, high alumina content cement, slag cement, silica cement, or a combination thereof.

Embodiment 47 provides the method of any one of Embodiments 1-46, wherein at least one of prior to, during, and after the placing of the weighted composition in the subterranean formation, the weighted composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

Embodiment 48 provides the method of any one of Embodiments 1-47, wherein the weighted composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 49 provides the method of any one of Embodiments 1-48, wherein the placing of the weighted composition in the subterranean formation comprises fracturing at least part of the subterranean follnation to form at least one subterranean fracture.

Embodiment 50 provides the method of any one of Embodiments 1-49, wherein the weighted composition further comprises a proppant, a resin-coated proppant, or a combination thereof.

Embodiment 51 provides the method of any one of Embodiments 1-50, wherein the placing of the weighted composition in the subterranean formation comprises pumping the weighted composition through a tubular disposed in a wellbore and into the subterranean formation.

Embodiment 52 provides the method of any one of Embodiments 1-51, wherein the placing of the weighted composition in the subterranean formation comprises pumping the weighted composition through a drill string disposed in a wellbore, through a drill bit at a downhole end of the drill string, and back above-surface through an annulus.

Embodiment 53 provides the method of Embodiment 52, further comprising processing the weighted composition exiting the annulus with at least one fluid processing unit to generate a cleaned weighted composition and recirculating the cleaned weighted composition through the wellbore.

Embodiment 54 provides a system for performing the method of any one of Embodiments 1-53, the system comprising:
a tubular disposed in the subterranean formation; and
a pump configured to pump the weighted composition in the subterranean formation through the tubular.

Embodiment 55 provides a system for performing the method of any one of Embodiments 1-54, the system comprising:
a drill string disposed in a wellbore, the drill string comprising a drill bit at a downhole end of the drill string;
an annulus between the drill string and the wellbore; and
a pump configured to circulate the weighted composition through the drill string, through the drill bit, and back above-surface through the annulus.

Embodiment 56 provides a method of treating a subterranean formation, the method comprising:
placing in the subterranean formation a weighted composition comprising a coated weighting agent comprising
acid-treated iron oxide; and
a crystalline inorganic coating material on the iron oxide, wherein the crystalline inorganic coating material is selected from the group consisting of barium sulfate, calcium carbonate, and combinations thereof.

Embodiment 57 provides a system comprising:
a tubular disposed in a subterranean formation;
a pump configured to pump a weighted composition in the subterranean formation through the tubular, the weighted composition comprising a coated weighting agent comprising
a weighting agent; and
an inorganic coating material on the weighting agent.

Embodiment 58 provides the system of Embodiment 57, wherein the tubular comprises a drill string disposed in a wellbore, the drill string comprising a drill bit at a downhole end of the drill string, the system further comprising an annulus between the drill string and the wellbore, wherein the pump is configured to circulate the weighted composition through the drill string, through the drill bit, and back above-surface through the annulus.

Embodiment 59 provides the system of any one of Embodiments 57-58, further comprising a fluid processing unit configured to process the weighted composition exiting the annulus to generate a cleaned drilling fluid for recirculation through the wellbore.

Embodiment 60 provides a coated weighting agent for treatment of a subterranean formation comprising:
a weighting agent; and
an inorganic coating material on the weighting agent.

Embodiment 61 provides the weighted composition of Embodiment 60, wherein the weighting agent is an acid-treated weighting agent.

Embodiment 62 provides a weighted composition for treatment of a subterranean formation, the weighted composition comprising the coating weighting agent of any one of Embodiments 60-61.

Embodiment 63 provides the weighted composition of Embodiment 62, wherein the weighted composition is a composition for drilling of the subterranean formation.

Embodiment 64 provides the weighted composition of any one of Embodiments 62-63, wherein the weighted composition is a drill-in fluid.

Embodiment 65 provides the weighted composition of any one of Embodiments 62-64, wherein the weighted composition further comprises a downhole fluid.

Embodiment 66 provides a coated weighting agent for treatment of a subterranean formation comprising:
acid-treated iron oxide; and
a crystalline inorganic coating material on the weighting agent, wherein the crystalline inorganic coating material is selected from the group consisting of barium sulfate, calcium carbonate, and combinations thereof.

Embodiment 67 provides a method of preparing a weighted composition for treatment of a subterranean formation, the method comprising:

forming a weighted composition comprising a coated weighting agent comprising
a weighting agent; and
an inorganic coating material on the weighting agent.

Embodiment 68 provides the method of Embodiment 67, wherein the weighting agent is an acid treated weighting agent.

Embodiment 69 provides the method of any one of Embodiments 67-68, comprising acid treating the weighting agent before forming the weighted composition.

Embodiment 70 provides the method of any one of Embodiments 67-69, wherein preparing the coated weighting agent comprises growing the inorganic coating material on the weighting agent as one or more crystals.

Embodiment 71 provides the method of any one of Embodiments 67-70, wherein preparing the coated weighting agent comprises using the weighting agent to seed crystallization of the inorganic coating material.

Embodiment 72 provides the method of Embodiment 71, wherein the crystalline inorganic coating material comprises a first ion and a corresponding second counterion.

Embodiment 73 provides the method of Embodiment 72, wherein the growing the crystalline inorganic coating material on the weighting agent comprises:

adding the weighting agent to a solvent comprising water;
adding a salt comprising the first ion of the crystalline inorganic coating material;
adding a solution comprising the second corresponding counterion; and
forming the crystalline inorganic coating material on the weighting agent.

Embodiment 74 provides the method of any one of Embodiments 72-73, wherein the growing the crystalline inorganic coating material on the weighting agent comprises:

treating the weighting agent with acid to form an acid-etched weighting agent;
adding the acid-etched weighting agent to a solution comprising water;
adding a salt comprising the first ion of the crystalline inorganic coating material;
adding a solution comprising the second corresponding counterion; and
forming the crystalline inorganic coating material on the acid-etched weighting agent.

Embodiment 75 provides the composition, apparatus, method, or system of any one or any combination of Embodiments 1-73 optionally configured such that all elements or options recited are available to use or select from.

What is claimed is:

1. A method of treating a subterranean formation, the method comprising:
placing in the subterranean formation a weighted composition, wherein the weighted composition comprises a coated weighting agent, wherein the coated weighting agent comprises a weighting agent and an inorganic coating material on the weighting agent, wherein the inorganic coating material comprises barium sulfate, wherein the coated weighting agent has a surface coverage of about 10% to about 40% of the weighting agent, and wherein the coated weighting agent has a specific gravity of 4 to 18.

2. The method of claim 1, further comprising drilling into a production zone or reservoir in the subterranean formation using the weighted composition as a drill-in fluid.

3. The method of claim 1, further comprising cleaning the coated weighting agent from a production zone or reservoir after drilling into the production zone or reservoir.

4. The method of claim 3, wherein the cleaning comprises at least partially dissolving the coated weighting agent with an acidic solution, and/or, wherein the coated weighting agent has a greater surface roughness than the weighting agent, and, optionally, wherein the coated weighting agent has about 101% to about 100,000% of the surface area of the weighting agent, and, optionally, wherein the coated weighting agent has about 110% to about 10,000% of the surface area of the weighting agent.

5. The method of claim 4, wherein the coated weighting agent is a homogeneous suspension in the weighted composition, and, optionally, wherein the coated weighting agent does not settle out of the suspension under static conditions, and, optionally, wherein the coated weighting agent settles out of the suspension under static conditions more slowly than a suspension of the weighting agent in a corresponding composition that is free of the coated weighting agent under static conditions, and, optionally, wherein the coated weighting agent has a particle size of at least about 0.1 μm.

6. The method of claim 1, wherein the weighting agent is an acid-treated weighting agent.

7. The method of claim 6, wherein the acid-treated weighting agent has greater surface area than a corresponding weighting agent not treated with acid, and, optionally, wherein the acid-treated weighting agent has a greater surface roughness than a surface roughness of a corresponding weighting agent not treated with acid, and, optionally, wherein the acid-treated weighting agent has greater concentration of inorganic coating material-seeding sites than the concentration of such seeding sites on a corresponding weighting agent not treated with acid.

8. The method of claim 1, wherein the weighting agent is selected from the group consisting of allemontite, altaite, aluminum oxide, anglesite, tin oxide, antimony trioxide, awaruite, barium sulfate, bastnaesite, beryllium oxide, birnessite, bismite, bismuth oxycarbonates, bismuth oxychloride, bismuth trioxide, bismuth (III) oxide, bixbyite, bournonite, braunite, brucite, cadimum sulfide, calayerite, calcium oxide, calcium carbonate, cassiterite, cerium oxide, cerussite, chromium oxide, clinoclase, columbite, copper, copper oxide, corundum, crocoite, cuprite, dolomite, euxenite, fergusonite, franklinite, gahnite, geothite, greenockite, hausmmanite, hematite, hercynite, hessite, ilvaite, Jacobsite, magnesium oxide, manganite, manganosite, magnetite, manganese dioxide, manganese (IV) oxide, manganese oxide, manganese tetraoxide, manganese (II) oxide, manganese (III) oxide, microlite, minium, molybdenum (IV) oxide, molybdenum oxide, molybdenum trioxide, nickel oxide, pearceite, phosgenite, psilomelane, pyrochlore, pyrolusite, rutile, scandium oxide, siderite, smithsonite, spessartite, stillwellite, stolzite, strontium oxide, tantalite, tenorite, tephroite, thorianite, thorite, tin dioxide, tin (II) oxide, titanium dioxide, vanadium oxide, vanadium trioxide, vanadium (IV) oxide, vanadium (V) oxide, witherite, wulfenite, yttrium oxide, zincite, zircon, zirconium oxide, zirconium silicate, zinc oxide, and combinations thereof.

9. The method of claim 1, wherein the inorganic coating material further comprises calcium carbonate, and wherein the inorganic coating material is about 1 wt % to about 50 wt % of the coated weighting agent.

10. The method of claim 1, wherein the inorganic coating material is at least partially acid soluble at a pH of less than about 6.5.

11. The method of claim 1, further comprising cleaning the coated weighting agent from the subterranean formation.

12. The method of claim 1, further comprising dissolving the coated weighting agent with an acidic solution.

13. The method of claim 1, further comprising combining the weighted composition with an aqueous or oil-based fluid.

14. The method of claim 1, wherein the weighted composition further comprises a viscosifier, wherein the viscosifier is about 0.0001 wt % to about 10 wt % of the weighted composition.

15. The method of claim 1, wherein the weighted composition further comprises a crosslinker, wherein the crosslinker is about 0.0001 wt % to about 5 wt % of the weighted composition.

16. The method of claim 1, wherein the weighted composition further comprises a breaker, wherein the breaker is about 0.001 wt % to about 30 wt % of the weighted composition.

17. A method of treating a subterranean formation, the method comprising:

placing in the subterranean formation a weighted composition, wherein the weighted composition comprises a coated weighting agent, wherein the coated weighting agent comprises a weighting agent and an inorganic material on the weighting agent, wherein the inorganic coating material coats about 10% to about 25% of the surface of the weighting agent;

wherein the weighting agent is iron oxide, and wherein the inorganic coating material comprises barium sulfate, and wherein the coated weighting agent has a specific gravity of 4 to 18.

18. The method of claim 17, further comprising cleaning the coated weighting agent from the subterranean formation.

19. The method of claim 17, further comprising dissolving the coated weighting agent with an acidic solution.

20. The method of claim 17, wherein the inorganic coating material further comprises calcium carbonate.

* * * * *